US007417942B2

(12) United States Patent
Miyamoto et al.

(10) Patent No.: US 7,417,942 B2
(45) Date of Patent: Aug. 26, 2008

(54) INFORMATION RECORDING MEDIUM AND INFORMATION REPRODUCTION METHOD

(75) Inventors: Harukazu Miyamoto, Higashimurayama (JP); Hiromi Kudo, Kokubunji (JP); Takeshi Maeda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 10/639,724

(22) Filed: Aug. 13, 2003

(65) Prior Publication Data
US 2004/0174792 A1  Sep. 9, 2004

(30) Foreign Application Priority Data
Mar. 4, 2003  (JP)  ............................. 2003-056518

(51) Int. Cl.
*G11B 20/12* (2006.01)

(52) U.S. Cl. .................................. 369/275.3; 369/69.25

(58) Field of Classification Search ........................ None
See application file for complete search history.

(56) References Cited

U.S. PATENT DOCUMENTS

| 5,452,284 | A | * | 9/1995 | Miyagawa et al. | ....... 369/44.28 |
| 5,936,932 | A | * | 8/1999 | Nakane et al. | ........... 369/275.3 |
| 6,744,718 | B1 | * | 6/2004 | Ko et al. | ................... 369/59.25 |
| 2003/0137911 | A1 | * | 7/2003 | Nakao et al. | ............. 369/47.22 |

FOREIGN PATENT DOCUMENTS

| JP | 9-106549 | 4/1997 |
| JP | 2856390 | 11/1998 |

* cited by examiner

*Primary Examiner*—Joseph Feild
*Assistant Examiner*—Tawfik Goma
(74) *Attorney, Agent, or Firm*—Antonelli, Terry, Stout & Kraus, LLP.

(57) ABSTRACT

There are provided parts where respective addresses of grooves on both sides of a land are identical to each other, and selection marks indicating validity of the parts are disposed. The selection marks determines the validity by taking advantage of the fact that there occurs a difference in wobble waveform in the land between a case of wobble data of the grooves on both sides of the land are identical and a case of the wobble data differ from each other. In this case, the wobble address method having an advantageous format efficiency can be used in combination with land/groove recording capable of narrowing down tracks, so that a reproduction method using a large capacity optical disc capable of high-density recording can be implemented.

18 Claims, 13 Drawing Sheets

| S0 | S1 | S2 | S3 | S4 | S5 | S6 | S7 | S8 | S9 | S10 | S11 | S12 |

TRACK ID INFORMATION a | TRACK NUMBER | RESERVED | PARITY |
| 24 BITS | 8 BITS | 20 BITS |
b | TRACK NUMBER | RESERVED | PARITY |

FIG. 8

|        | S0  |    | S1  |    | S2  |    | S3  |    |
|--------|-----|----|-----|----|-----|----|-----|----|
|        | ma  | mb | ma  | mb | ma  | mb | ma  | mb |
| TG(4n)   | 0 | 1 | 0 | 1 | 0 | 1 | 0 | 1 |
| TG(4n+1) | 0 | 0 | 0 | 0 | 0 | 0 | 0 | 0 |
| TG(4n+2) | 1 | 0 | 1 | 0 | 1 | 0 | 1 | 0 |
| TG(4n+3) | 1 | 1 | 1 | 1 | 1 | 1 | 1 | 1 |

G ODD:a EVEN:b
L COINCIDING SIDE (LARGER AMPLITUDE)

FIG. 9

|          | S0  |      | S1  |      | S2  |      | S3  |      |
|----------|-----|------|-----|------|-----|------|-----|------|
|          | a   | b    | a   | b    | a   | b    | a   | b    |
| TG(4n)   | 4n  | 4n-1 | 4n  | 4n-1 | 4n  | 4n-1 | 4n  | 4n-1 |
| TG(4n+1) | 4n  | 4n+1 | 4n  | 4n+1 | 4n  | 4n+1 | 4n  | 4n+1 |
| TG(4n+2) | 4n+2| 4n+1 | 4n+2| 4n+1 | 4n+2| 4n+1 | 4n+2| 4n+1 |
| TG(4n+3) | 4n+2| 4n+3 | 4n+2| 4n+3 | 4n+2| 4n+3 | 4n+2| 4n+3 |

FIG. 16

| | WORD0 | | | | | | | | ---- | WORD4 | | | |
|---|---|---|---|---|---|---|---|---|---|---|---|---|
| | S0 | | S1 | | S2 | | S3 | | | S11 | | S12 | |
| | Ma | Mb | Ma | Mb | Ma | Mb | Ma | Mb | | Ma | Mb | Ma | Mb |
| TG(4n)   | 0 | 1 | 0 | 0 | 1 | 0 | 1 | 1 | | 1 | 1 | 0 | 1 |
| TG(4n+1) | 0 | 0 | 1 | 0 | 1 | 1 | 0 | 1 | | 0 | 1 | 0 | 0 |
| TG(4n+2) | 1 | 0 | 1 | 1 | 0 | 1 | 0 | 0 | | 0 | 0 | 1 | 0 |
| TG(4n+3) | 1 | 1 | 0 | 1 | 0 | 0 | 1 | 0 | | 1 | 0 | 1 | 1 |

G ODD:a  EVEN:b
L COINCIDING SIDE (LARGER AMPLITUDE)

FIG. 17

| | WORD0 | | | | | | | | | |
|---|---|---|---|---|---|---|---|---|---|---|
| | S0 | | S1 | | S2 | | S3 | | S4 | |
| | a | b | a | b | a | b | a | b | a | b |
| TG(4n)   | 4n   | 4n-1 | 4n-1 | 4n   | 4n   | 4n-1 | 4n-1 | 4n   | 4n   | 4n-1 |
| TG(4n+1) | 4n   | 4n+1 | 4n+1 | 4n   | 4n   | 4n+1 | 4n+1 | 4n   | 4n   | 4n+1 |
| TG(4n+2) | 4n+2 | 4n+1 | 4n+1 | 4n+2 | 4n+2 | 4n+1 | 4n+1 | 4n+2 | 4n+2 | 4n+1 |
| TG(4n+3) | 4n+2 | 4n+3 | 4n+3 | 4n+2 | 4n+2 | 4n+3 | 4n+3 | 4n+2 | 4n+2 | 4n+3 |

INFORMATION RECORDING MEDIUM AND INFORMATION REPRODUCTION METHOD

FIELD OF THE INVENTION

The invention relates to a recording format of an information recording medium, that is, an information recording medium wherein address information for identification of recording areas is disposed, and an information reproduction method using the information recording medium.

BACKGROUND OF THE INVENTION

A track structure of a conventional optical disc is described by way of example hereinafter with reference to FIGS. 3 and 4. There are alternately disposed a plurality of groove tracks 3 and land tracks 4 on a disc-like recording medium in the direction of a radius of the disc-like recording medium. The respective tracks are formed in such a shape as to be wobbled in the direction of the radius by a minute amount. Further, the respective tracks are divided into a plurality of arc-like sectors aligned along the direction of the radius, and a header 6 having address information for identification of recording areas is disposed at the leading edge of the respective arc-like sectors. The respective headers 6 are aligned with each other along the direction of the radius, that is, radially disposed.

FIG. 3 shows in detail the header at the respective lead edges of the tracks, that is, an address information portion where ID information for corresponding recording areas is recorded. In FIG. 3, the address information of the respective tracks is radially disposed at twp places, that is, a first position 21, and a second position 22, respectively, in such a manner as to be aligned along the direction of the radius. Portions of the respective groove tracks 3 at the front of, and at the back of the header, respectively, are connected with each other while portions of the respective land tracks 4 at the front of, and at the back of the header, respectively, are connected with each other. In the case of an example shown in the figure, respective pieces of the address information correspond to respective recording areas of the information tracks, on the right-hand side in the figure. Further, the address information corresponding to the groove information track 3 on the right-hand side in the figure is disposed at the first position 21, and the address information corresponding to the land information track 4 is disposed at the second position 22, both the address information being disposed in the form of pits 23. That is, the address information is disposed such that respective positions of the address information in the tracks adjacent to each other, along the direction of the information track, differ from each other, and respective positions of the address information in the tracks, apart from each other by two tracks, along the direction of the information track, coincide with each other. That is, as seen on the boundary line between the land track and the groove track, it is configured such that disposition positions of the ID information are divided into a first area and second area, and a first ID information area and second ID information area are alternately used for every other track.

The ID information in the header is provided in the form of microscopic indentations (pits), which are formed as asperities etc. on a substrate of a disc at the time of fabricating the disc, concurrently with grooves and so forth. For a recording film, use is made of a phase-change recording film (GeSbTe), and recording marks are formed in the shape of an amorphous area, respectively.

The conventional example described above is described in detail in, for example, JP-B No. 2856390, and so forth.

Meanwhile, another conventional example wherein address information is recorded with wobbles of grooves instead of recording in a header is described in, for example, JP-A No. 106549/1997.

With this example, frequency modulated wobbled grooves are used for recording address data. There are provided about 3360 pieces of wobbles per one revolution of a disc. For 1 bit of address data, 7 cycles of the wobbles are used. To express a bit "1", 4 cycles of the wobbles are used in the first half of the 7 cycles while 3 cycles of the wobbles are used in the last half thereof. In other words, the wobbles are provided at high frequency in the first half, and at low frequency in the last half, a frequency ratio in this case being 4:3. To express a bit "0", the order is reversed, and it is expressed by wobbles at low frequency, corresponding to 3 cycles in the first half, and wobbles at high frequency, corresponding to 4 cycles in the last half. An address code word is composed of 60 address bits. The number of address code words per one revolution of a track is 8. Out of the 60 bits of the address code word, 14 bits represent parity (CRC) for detection of an error, and the first 4 bits represent synchronization information for synchronizing with the address code word. 20 bits out of the balance represent track information (track number).

However, with the conventional example in JP-B No. 2856390, as previously described, the header has no groove, and cannot be used as a recording area, so that there has arisen a problem of deterioration in utilization efficiency (format efficiency) of recording tracks, rendering the same disadvantageous from the viewpoint of attaining a high capacity.

Further, with the conventional example described in JP-A No. 106549/1997, it has been impossible to dispose the address information except in the grooves. This is because the tracks adjacent to each other have different track numbers, respectively, so that about 10 bits out of the 60 bits including parity inevitably represent different data. Accordingly, even if an attempt is made to record information in a land between the grooves, since wobble information of the grooves, adjacent to the land, on both sides thereof, are differ from each other, wobble information cannot properly be reproduced. Further, because there occurs a portion of the land, where respective phases of wobbles of the grooves adjacent the land, on both sides thereof, are not aligned with each other, portions of the land, narrow in width and portions of the land, wide in width will result, thereby creating a cause for cross-talk from adjacent tracks at the time of recording or reproduction, so that this example cannot be applied land/groove recording. As a result, since recording can be made only in either lands or grooves, it is still difficult with this example as well to aim at higher capacity.

SUMMARY OF THE INVENTION

It is therefore a first object of the invention to provide an information recording medium for high-density recording, having a high format efficiency and capable of narrowing down tracks. Further, a second object of the invention is to provide a highly reliable reproduction method using the information recording medium for high-density recording.

To attain the first object, the following means are used:

(1) With an information recording medium having a plurality of tracks, the tracks each comprising at least one segment extending in the circumferential direction of the respective tracks, an address information area disposed in each of the segments, and a first address information area and a second address information area, extending in the circumferential direction of the respective tracks and disposed in each of the address information areas, a selection signal indicating which of the first address information area and the second address information area is valid is disposed in each of the segments.

Thus, while mixedly disposing information valid for the relevant track and information invalid for the relevant track but valid to another track, it becomes possible to identify which information is valid to the relevant track, so that address information disposed in one track can be used in common with another track. Accordingly, for example, in the case of the land/groove recording mode, address information is disposed in grooves (or lands) only, and information recorded in adjacent tracks can be shared in lands (or grooves) to be used as the address information. Hence, a recording medium with address information highly efficiently disposed can be provided.

(2) The selection signal is disposed such that the first address information area and the second address information area become alternately valid from the segment to the segment.

As a result, since the first address information area and the second address information area can be evenly used, even if defects and the like are concentrated in either thereof, the address information can be reproduced with certainty, thus rendering the information recording medium suitable for highly reliable detection of addresses.

(3) The selection signal is disposed such that the first address information area and the second address information area become alternately valid from the track to the track.

As a result, since an address area for use in the track is different from those in adjacent tracks, even if the tracks are highly densified to the extent that address information in the adjacent tracks adversely affects an address information reproduction signal for the track, areas not affected by the adjacent tracks can be used with ease, thus rendering the information recording medium suitable for high-track-density recording. This method is optimum as an addressing method for a land/groove type optical disc using both the lands and grooves as recording areas, and so forth.

(4) The selection signal is disposed such that the first address information area and the second address information area become alternately valid from the segment to the segment and the number of the segments per track is odd.

As a result, since the first address information area and the second address information area can be evenly used, information can be reproduced with certainty. Further, since the number of the segments per track is odd, if valid areas are alternately disposed from the segment to the segment, a valid area is inverted one track ahead without fail, so that sharing of an address with the adjacent tracks can be implemented with ease.

(5) The first address information area and the second address information area comprise at least track ID information, respectively, and the track ID information recorded in the first address information area differs from the track ID information recorded in the second address information area within the same segment.

As a result, the track can be identified by use of either of the first address information and in the second address information within the same segment.

(6) The address information comprises at least track identification information and angular position identification information and respective pieces of the angular position identification information in a plurality of the tracks are identical to each other.

As a result, angular information can be reproduced with certainty, and the angular information does not change upon accessing other tracks, so that rotational synchronization at the time of accessing is facilitated, which is suitable for highly reliable accessing at a high speed.

(7) The address information comprises at least the track identification information and the angular position identification information and the angular position identification information is disposed such that an angular position is established by reproduction of the angular position identification information corresponding to at least a portion of one round of the track.

As a result, time required for rotational synchronization with the disc can be reduced, which is suited for accessing at a high speed.

(8) The address information is disposed so as to be interleaved throughout a plurality of the segments. As a result, a signal from the first address information area and the second address information area, respectively, can be alternately obtained, so that stable reproduction is implemented with ease.

(9) The track comprises two sequences of information tracks, alternately disposed, and in the information track of one sequence out of the two sequences, first address information is identical to that in either of adjacent information tracks of the same sequence while second address information is identical to that in the other of the adjacent information tracks of the same sequence.

As a result, the address information can be efficiently disposed in the information recording medium having the two sequences of the information tracks like one for land/groove recording. Since the land/groove recording method is suited to narrow down the tracks, a high density information recording medium can be provided.

In order to attain the second object of the invention, the following means are used.

(10) Address information is reproduced by use of means concurrently reproducing and decoding first and second address information, and the steps of evaluating reliability of the first and second address information, respectively, and selecting address information with higher reliability between the first and second address information.

By so doing, an address can be reproduced with certainty corresponding to a degree of reliability, and address information of a sequence as required can be obtained without re-reading the address, thereby facilitating accessing at a high speed.

(11) For determination by reproduction of first and second address information and a selection signal indicating which of the first address information and the second address information is valid, at least a plurality of the selection signals are reproduced.

By so doing, erroneous determination and erroneous detection of addresses can be prevented with greater ease, thereby enhancing reliability of address reproduction.

The invention under the present application includes the following configurations as well.

(12) With an information recording medium having a plurality of tracks, wherein the respective tracks at least comprise a plurality of segments, having redundancy of identical information being maintained in at least two of the segments of the same track, the redundancy is provided such that original information can be restored by extracting part by part from an optional portion of a plurality of segments with identical information disposed therein and synthesizing the parts.

By so doing, in the event of failure to reproduce part or the whole of a segment due to a defect or the like, the address information can be reproduced with certainty by use of information of other segments, so that reliability can be enhanced.

(13) With an information recording medium having a plurality of tracks, the respective tracks at least comprise a plurality of segments, identical information is maintained in at least two of the segments of the same track, and information for detection/correction of an identical error is at least added to the identical information and is disposed in the respective segments along with the address information.

By so doing, in the event of failure to reproduce part or the whole of a segment due to a defect or the like, the address information can be reproduced by performing detection/correction of an error with certainty using information of other segments, so that reliability can be enhanced.

BRIEF DESCRIPTION OF THE DRAWINGS

FIG. 8 is a schematic representation showing an example of a wobble address format according to the second embodiment of the invention;

FIG. 9 is a schematic representation showing autocorrelation function and cross correlation function of wobble rows according to the second embodiment of the invention;

FIG. 16 is a schematic representation showing another example of the wobble address format according to the fifth embodiment of the invention;

FIG. 17 is a schematic representation showing autocorrelation function and cross correlation function of wobble rows according to the fifth embodiment of the invention.

DETAILED DESCRIPTION OF PREFERRED EMBODIMENTS

First Embodiment

Figure 18:
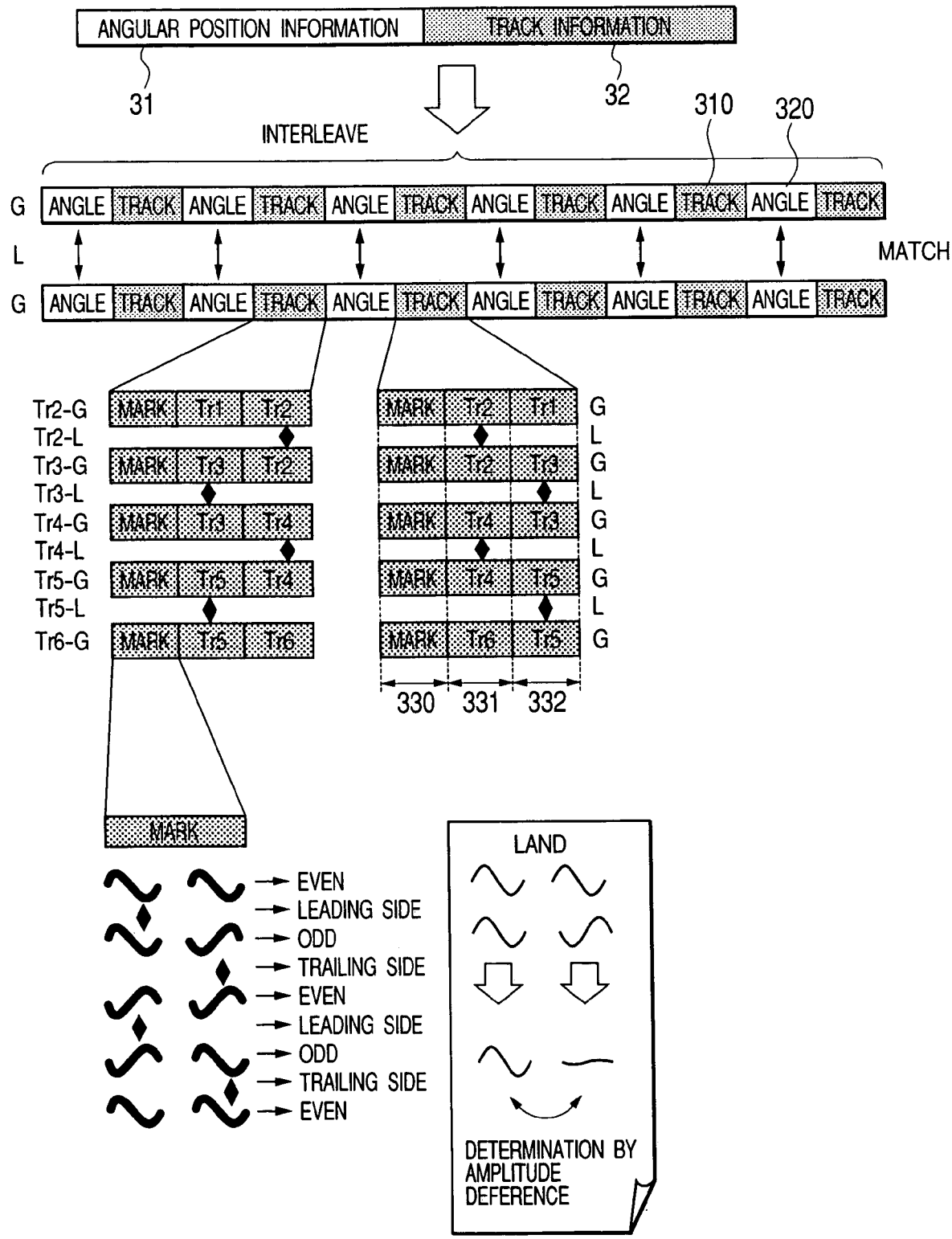
FIG. 18 is a schematic representation illustrating the principle of configuration of embodiments of the invention.

FIG. 18 is a schematic representation broadly illustrating a first embodiment of the invention. Address information is shown after divided into angular information and track information. The angular information 31 and track information 32 are interleaved in respective tracks. The address information itself in the form of a groove wobble signal (minute displacement in the direction of a radius of a groove) is disposed only in respective grooves. The wobble signal can be detected by taking advantage of asymmetry of distribution of reflected light amounts of reproduced light, occurring due to a deviation of the respective grooves from the center of a light spot, that is, by a so-called push-pull signal. The push-pull signal is similar to what is used as a tracking error signal when using a tracking servo for causing the respective grooves to trace the light spot, but since servo is operated so as to shift a lens of an optical head, a servo tracking band is within several kHz. Accordingly, when a signal at a frequency not lower than several hundred kHz is disposed as the wobble signal, the light spot cannot trace the wobble signal even if the light spot is caused to trace the respective grooves by the agency of the servo, so that there are generated the push-pull signal occurring due to a deviation of the respective grooves from the center of the light spot, thereby obtaining the wobble signal.

Figure 2:
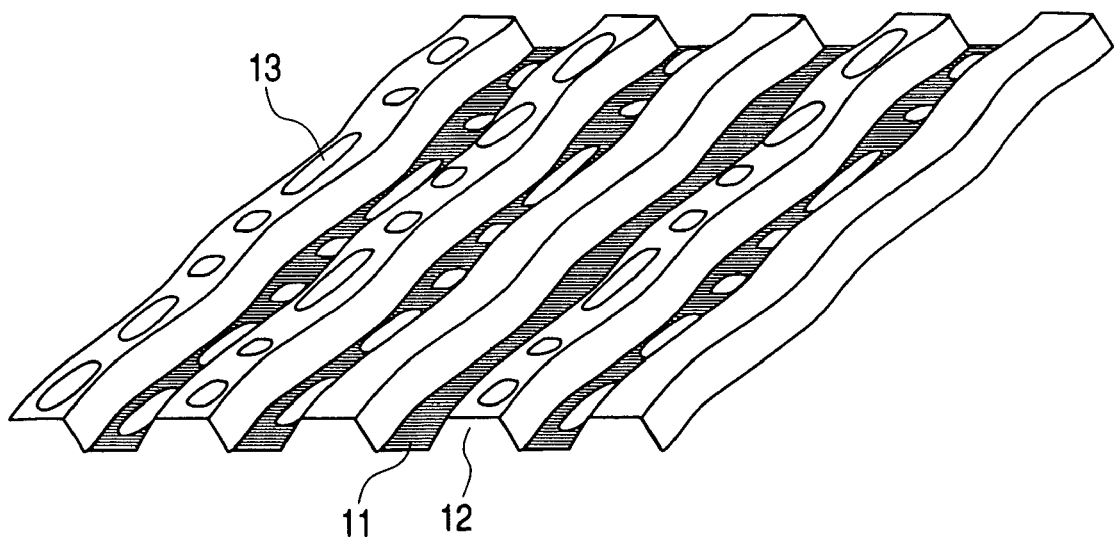
FIG. 2 is a partly enlarged view of an optical disc according to an embodiment of the invention.
Figure 3:
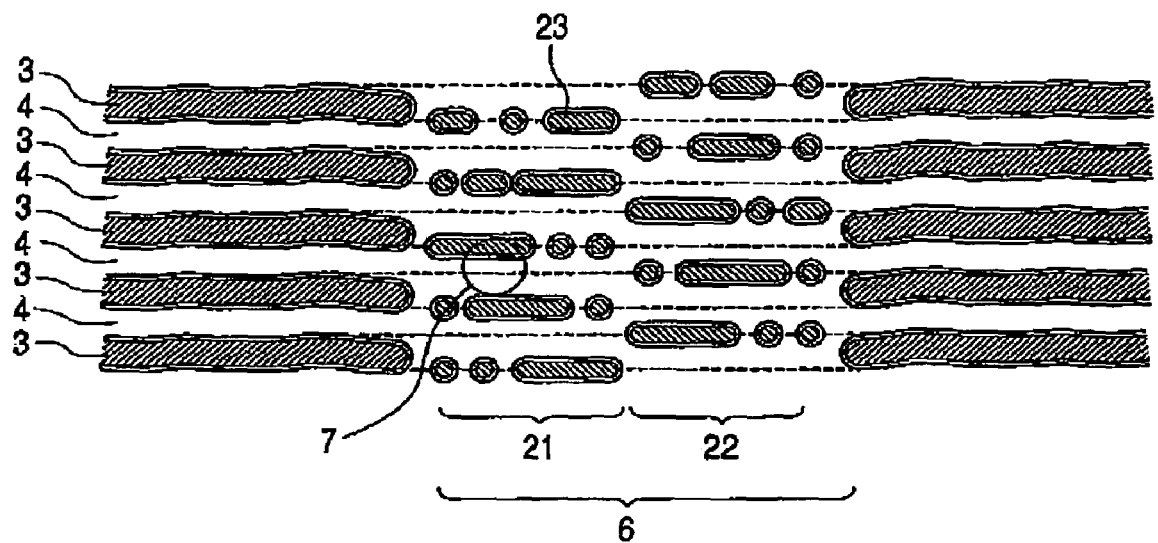
FIG. 3 is a schematic representation illustrating a conventional optical disc format.
Figure 4:
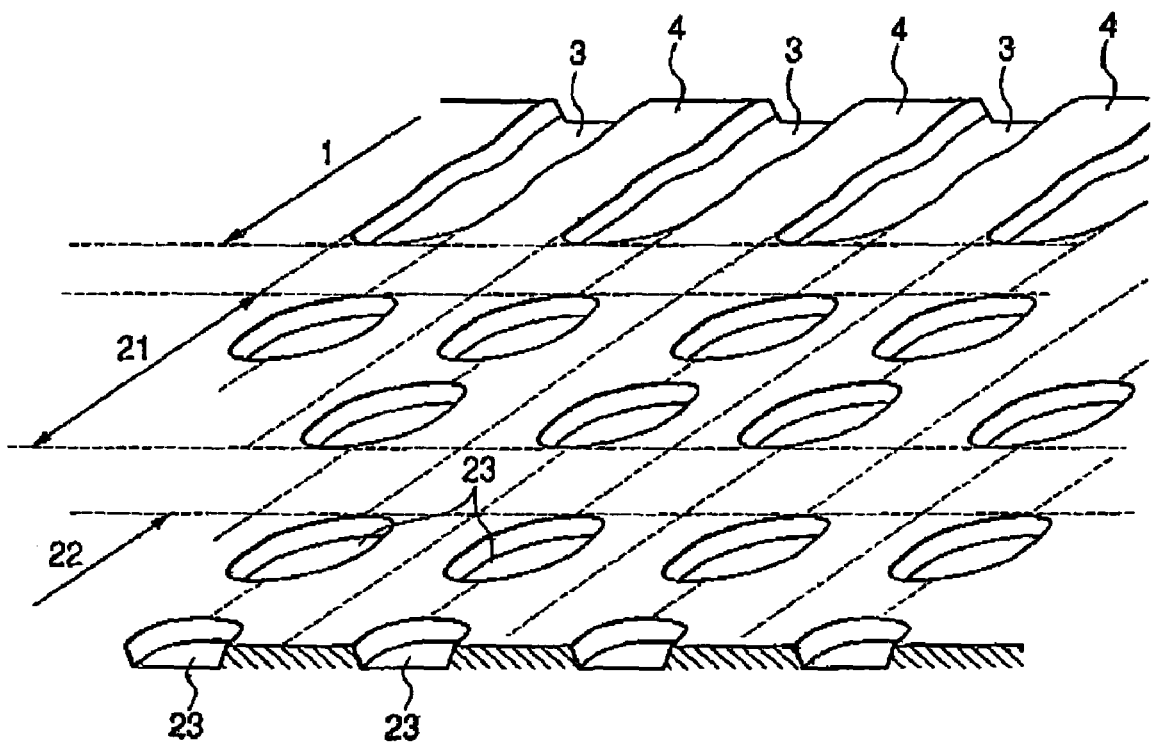
FIG. 4 is a partly enlarged view of the conventional optical disc.

A land is an area sandwiched between grooves on both sides of the land, and adjacent thereto, as shown in FIG. 2, and accordingly, in the case where wobbles of the grooves on both sides of the land are identical, the land is caused to wobble in the identical way, so that identical information is disposed in the land as well. However, in a region where respective pieces of information, in the grooves on both sides of the land, differ from each other, it is not a pure "wobble" that occurs to the land, but respective widths of the grooves are modulated, so that the wobble signal cannot be reproduced. With the present invention, respective angular information 31 among respective information as interleaved is the same throughout respective tracks. As for respective track information 32 as interleaved, an area thereof is further divided into three sub-areas, that is, a mark 330, first track information area 331, and second track information area 332, in that order from the front to the back. The track information recorded in the first track information area 331 differs from that recorded in second track information area 332.

In the figure, respective pieces of information, designated as [Tr1] and [Tr2], are disposed as the track information in the first and second track information areas, respectively, in a groove track Tr2-G. In which of the first track information area 331, and second track information area 332 [Tr1] and [Tr2] are disposed, respectively, varies for every track information area (segment) as interleaved, and [Tr1] and [Tr2] are disposed in the alternate order. Respective pieces of information, designated as [Tr3] and [Tr2], are disposed as the track information for the first and second track information areas, respectively, in a groove track Tr3-G adjacent to the groove track Tr2-G. In this case, the information designated as [Tr2] is disposed so as to be adjacent to the information [Tr2] in the previously described groove track. That is, since the two groove tracks adjacent to a land track Tr2-L, respectively, have identical information [Tr2], the groove wobble signal become same, so that it becomes possible to reproduce the information [Tr2] in this land track as well from the wobble signal. However, in a region of the land track Tr2-L, where the information designated as [Tr-1] or [Tr3] is recorded in the grooves, adjacent to the land track Tr2-L, respectively, respective pieces of track information, adjacent to each other, differ from each other, so that it is normally impossible to obtain a wobble signal in the land part in this region. Accordingly, the information [Tr2] only can be accurately reproduced in the land. As for the angular information, since the same is common to all the tracks, it goes without saying that a signal identical to the respective wobble signals of the groove tracks adjacent to the land track can be obtained in the land track as well.

In a lower part of FIG. 18, there is illustrated a state of wobble signal disposed in respective mark parts. When the wobble signals of grooves adjacent to the land, on both sides thereof, are identical, a sinusoidal signal identical to that in the respective grooves can be obtained in the land part as described, however, when the wobble signals of the grooves adjacent to the land, on both sides thereof, differ from each other, the wobble signals adjacent to each other cancel out each other in the land, so that only a signal of small amplitude can be obtained. For this reason, by disposing a pair of wobble marks as shown on the lower left side in FIG. 18, a track where leading portions of wobbles coincide with each other and a track where trailing portions of wobbles coincide with each other appear alternately in the land on a track by track basis. Accordingly, by comparing respective amplitudes of the pair of the marks with each other, it is possible to discriminate on which side of the pair of the marks respective phases of the marks coincide with each other in the land. By taking advantage of this, it becomes possible to determine in the land which address is valid, that of first track information or that of second track information. That is, the pair of the marks can be used as a selection signal indicating a valid area. It is possible to determine in the grooves which of the first track information and second track information is valid depending on whether the leading or trailing portions of the marks coincide with each other or differ from each other. With the following embodiments, the invention is described in more detail by referring to specific numerical values.

Second Embodiment

FIG. 2 is a partly enlarged view of an optical disc according to an embodiment of the invention. Respective information tracks include a groove 11 and land 12, spirally provided on a substrate in disc-like shape, respectively. User information is recorded as recording marks 13 having different reflectances in both the land 12 and groove 11. A track interval (an average distance between the respective centers of a groove track and land track, adjacent to each other) is 0.25 µm. The groove 11 is a grooved part provided on the substrate, and the grooved part is about 40 nm deep. With the present embodiment, since it is assumed that recording/reproduction are executed by an optical head with a numerical aperture of about 0.85 at wavelength of about 405 nm, the groove depth of about 40 nm is substantially equal to an optical distance corresponding to one sixth of the wavelength. The grooved part is formed so as to undergo minute displacements (wobbles) in the radial direction at amplitude of about 20 nmpp.

Figure 1A:
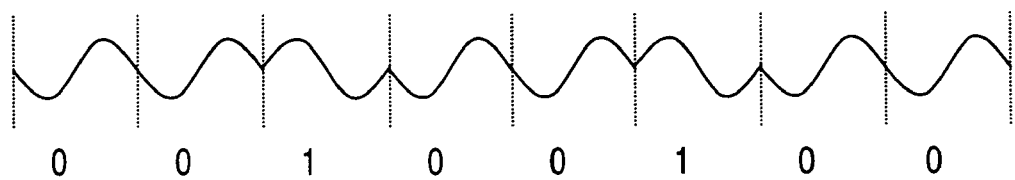
FIG. 1A is a schematic representation illustrating a waveform of a wobble address method according to an embodiment of the invention.
Figure 1B:
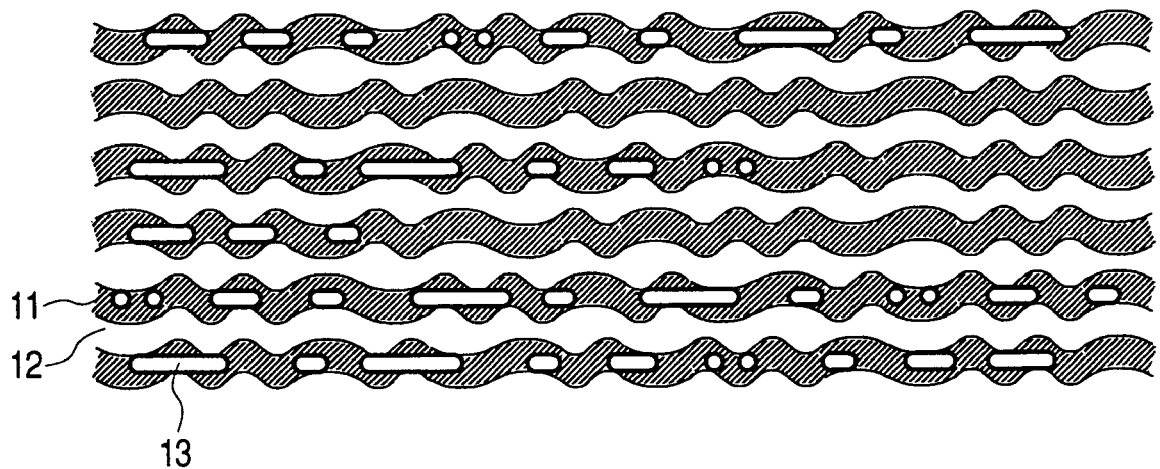
FIG. 1B is a partly enlarged view of an optical disc according to the embodiment of the invention.

Information is recorded in respective wobbles such that one cycle of sinusoidal wave corresponds to information "1" and one cycle of sinusoidal wave with a phase thereof, inverted by 180 degrees, corresponds to information "0" as shown in FIG. 1A. In this connection, the information recorded in the respective wobbles is mainly [address information] for specifying a recording area by guiding a light spot to an optional area on a disc and accessing thereto, which is preformed before shipment of the disc from a factory. Because of the need for identification of the respective tracks, different information is written to the address information of the respective tracks. For this reason, respective patterns of the wobbles are different track by track as shown in FIG. 1B, and by taking advantage of this, the respective tracks can be identified at the time of reproduction. In FIG. 1B, the wobbles are shown by shortening the respective cycles of the wobbles and by accentuating the respective amplitudes of the wobbles, in the radial direction, for the sake of clarity in explanation (because it is practically impossible to show in the figure the respective amplitudes of the wobbles, corresponding to about 8% of the respective widths of the tracks).

Since wobbles are physical displacements of respective grooves, the wobbles are generally produced in volume by normally transferring the same from a die at the time of molding a disc substrate. With the present embodiment as well, use is made of wobbles of a disc substrate fabricated by molding a polycarbonate (PC) substrate 1.1 mm thick with an injection molding machine using a nickel stamper produced or mastered in advance after exposure with UV laser light, development, and transfer, and by transfer from the mold. In the case of the present embodiment, a phase-change recording film is laminated to the PC substrate, and a transparent cover sheet 0.1 mm thick is bonded onto the phase-change recording film with a UV curing resin, thereby producing a disc 1.2 mm in total thickness.

Figure 5:
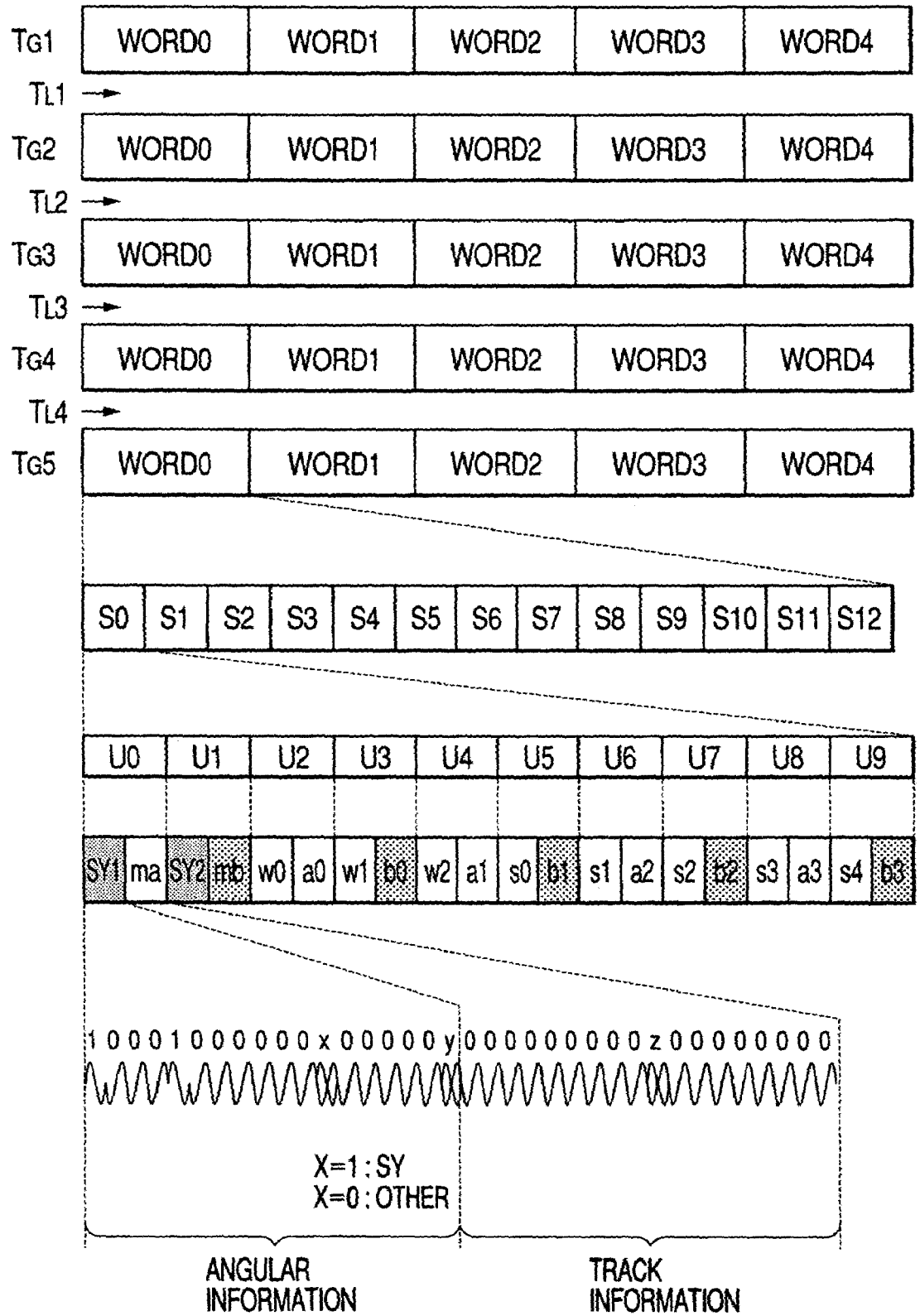
FIG. 5 is a schematic representation showing an example of a wobble address format according to a second embodiment of the invention.

FIG. 5 shows how wobble address information is disposed in respective tracks. In FIG. 5, information in respective groove tracks $T_G$ only is shown. The respective tracks comprise 5 words. The respective words comprise 13 segments, S0 through S12, and further, the respective segments comprise 10 units, U0 through U9.

The respective units comprise 36 cycles of the wobbles, and the first half 18 wobbles represent angular information while the latter half 18 wobbles represent track information. The angular information in the first half include "y", a portion expressing whether it is a synchronization code (SY), and an identification signal "x", combinations of "x" with "y" resulting in 4 different patterns. The latter half 18 wobbles express 1 bit of the track information "z".

Information (angular information) included in the first half of the respective units are SY1, SY2, w0, w1, w2, and s0 through s4. SY1, SY2 are synchronization marks showing that those units are at the head of the respective segments. Two of the synchronization marks are disposed in each of the segments in order to enhance reliability (redundancy). Three bits of w0, w1, and w2 express a word number. Since one track has 5 words, the three bits express word numbers 0 through 4, respectively. Symbols s0 through s4 are segment numbers, respectively, expressing at what place a segment is in sequence of the segments within the respective words. Accordingly, by reproducing the information (the angular information) corresponding to any one segment, it is possible to identify a position within the respective tracks, in the circumferential direction thereof, however, since one track has 65 (=5×13) pieces of the segments, there is sufficient redundancy, so that reliability can be ensured by making a comprehensive determination after reproduction of the information in a plurality of the segments.

Information included in the latter half of the respective units are interleaved alternately for every other unit, and even number units maintain information corresponding to 4 bits (a0 through a3) of first address information while odd number units express 4 bit (b0 through b3) of second address information. Mark signals "ma" and "mb", for indicating which address information is valid, are recorded in the units, U0 and U1, respectively, at the head of the respective segments. A method of determining which address is valid with a reproduction signal of the "ma" and "mb", respectively, will be described in detail later.

Thus, since 4 bits each of the first address information and the second address information, corresponding to 4 bits, respectively, are maintained in the respective segments, 52 bits each of the first address and second information are disposed in one word, that is, 13 segments.

Figures 6, 7:
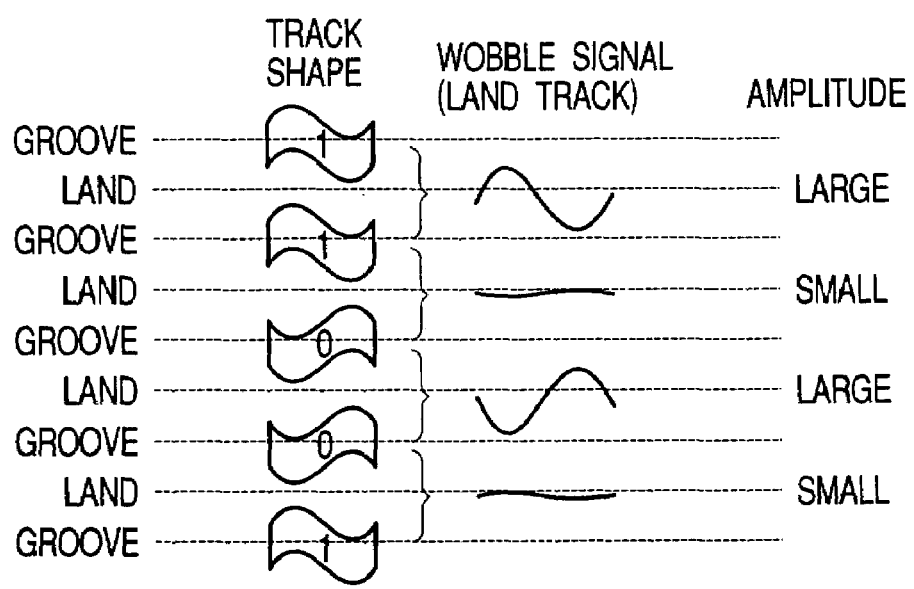
FIG. 6 is a schematic representation showing another example of the wobble address format according to the second embodiment of the invention.
FIG. 7 is a schematic representation illustrating the principle of detecting selection marks according to the invention.

FIG. 6 shows the breakdown of the 52 bits. That is, 24 bits of track number, 8 bits of reserved bits, and 20 bits of parity are recorded therein. The parity is made up as a Reed-Solomon code on Galois field GF ($2^4$), with 4 bits as one symbol. Accordingly, 20 bits correspond to 5 symbols, so that it is possible to correct errors up to 2 symbols out of 52 bits (13 symbols), and to detect errors up to 5 symbols. In the figure, a and b correspond to the first address information and the second address information, respectively.

Now, referring to FIG. 7, marks (selection signals) are described. As previously described, the mark that is a selection signal is disposed in the respective grooves, and for this signal, a sinusoidal wave or a sinusoidal wave with a phase thereof, inverted by 180 degrees, is disposed in the respective grooves, depending on whether the mark signal is "1" or "0". In a land track interposed between the grooves, the amplitude of a wobble signal significantly varies depending on whether the respective wobbles of groove tracks, on both sides of the land track, are identical or inverted from each other (in the case of the wobbles being mutually inverted, the amplitude ideally should become zero, however, because there occurs in practice delicate imbalance due to various errors and aberrations, a small signal is normally observed). As with the first embodiment previously described with reference to FIG. 18, by taking advantage of a large difference in amplitude between the wobble signals, it is possible to discriminate between the mark signals in the respective lands.

FIG. 8 shows a manner in which the mark signals are disposed in the respective segments. In the figure, $T_G$ (4n) denotes the 4n-th groove track. In the 4n-th groove track, 0 and 1 are assigned to a pair of the marks "ma" and "mb", respectively. In all the segments of the same track, information of the marks is same. In the 4(n+1)-th groove track, 0 and 0 are assigned to a pair of the marks "ma" and "mb", respectively, in the 4(n+2)-th groove track, 1 and 0 are assigned to a pair of the marks "ma" and "mb", respectively, and in the 4(n+3)-th groove track, 1 and 1 are assigned to a pair of the marks "ma" and "mb", respectively. With such an arrangement, the mark signals within parts in the figure, indicated by an ellipse, respectively, become common with those in the respective lands interposed between the adjacent grooves while the polarity of the wobble signal in the respective lands interposed between the adjacent grooves in other parts is reversed. Accordingly, as previously described with reference to FIG. 7, the mark signal in the respective lands of the parts surrounded by the ellipse, respectively, in FIG. 8, becomes larger as compared with those in other parts. For example, in a land track $T_L$ (4n) interposed between $T_G$(4n) and $T_G$(4n+1), the amplitude of the mark "ma" becomes larger than that of the mark "mb", and it can be determined from this that the first address information area "a" is valid. Similarly, in a land track $T_L$ (4n+1) interposed between $T_G$(4n+1) and $T_G$(4n+2), the amplitude of the mark "mb" becomes larger than that of the mark "ma", so that it can be determined that the second address information area "b" is valid. In the grooves, if "ma" differs from "mb", it is determined that "a" is valid, and if "ma" equals "mb", it is determined that "b" is valid. For example, in the groove $T_G$(4n), "ma" differs from "mb", so that it can be determined that the first address information area "a" is valid.

With the present embodiment, since there is a pair of the marks in the respective segments, there are 65 pairs thereof in each of the tracks. Further, since the 65 pairs are disposed so as to have the same information without fail, it becomes possible to determine a valid area with high reliability by detecting a plurality of the marks, and adopting a decision by the majority thereof. By taking advantage of the fact that the position of the valid area is reversed back-and-forth in adjacent tracks without exceptions, it is possible to enhance reliability of determination even in regions spreading across a plurality of the tracks.

FIG. 9 shows the address information disposed in the first and second address information areas, respectively. In the groove track $T_G$(4n), a track number 4n is disposed in the first address information area "a", and a track number (4n−1) is disposed in the second address information area "b". Accordingly, since the first address information area "a" is valid in the groove track $T_G$(4n) as previously described, valid address information (track number) is 4n. Further, in the groove track $T_G$(4n+1), the track number 4n is disposed in the first address information area "a" and a track number (4n+1) is disposed in the second address information area "b". Accordingly, in a land track $T_L$ (4n) interposed between the groove tracks $T_G$(4n) and $T_G$(4n+1), the first address information area becomes valid as previously described. Since respective pieces of the address information in the groove tracks adjacent to the land track $T_L$(4n), on both sides thereof, are both 4n in the first address information areas of the land track $T_L$(4n), it is possible to reproduce an address from the wobble signal in the land as in the groove, and 4n is obtained as address information.

With the present embodiment (FIG. 5), the number of the wobbles per one track is 5 (words)×13 (segments)×10 (units)×36 (wobbles)=23400, and is constant for all the tracks on the disc. That is, the wobbles themselves are recorded in constant angular velocity (CAV) mode. A cycle of the respective wobbles of a track at a position of the innermost radius 22 mm of the disc takes place across 6.4 μm, and that of a track at a position of the outermost radius 58 mm of the disc across 15.5 μm.

With the present embodiment, a channel bit length of user data recorded in the land tracks and groove tracks, respectively, is 0.06 μm. Because recording is made by use of RLL (1, 7) codes, the shortest mark length becomes 0.12 μm, and a user bit length about 0.9 μm. User capacity of the disc in whole is about 50 GB (per side). At the time of recording, a linear velocity of the disc is controlled so as to be constant. That is, CLV recording is carried out. With the present embodiment, the linear velocity is adjusted at 12 m/s such that a channel bit frequency is kept at 200 MHz. At the time of reproduction, a signal is reproduced in PRML mode. Since the disc is rotated at the CLV, the track at the innermost radius of the disc is quickly rotated at about 5200 rpm while the track at the outermost radius thereof is slowly rotated at a frequency of about 1900 Hz. Respective frequencies of the wobbles of the track at the innermost radius of the disc are about 2 MHz, and those at the outermost radius thereof are about 700 KHz. Since these frequencies are lower than the channel bit frequency by more than one order of magnitude, there is no risk of the wobble signals interfering with user recording signals. Further, in comparison with the servo's band of several KHz, these frequencies are higher by about two orders of magnitude, so that there is no need for worrying about an adverse effect on the servo.

Third Embodiment

An example of an optical recording and reproduction system using the optical disc according to the second embodiment of the invention is described hereinafter with reference to FIG. 10. FIG. 11A and 11B are block diagrams showing the optical recording and reproduction system employing an optical recording format of the invention. Light emitted from a laser light source 625 (in the case of the present embodiment, with a wavelength at about 405 nm), which is a part of an optical head 620, passes through a collimating lens 624, and is collimated into substantially parallel light beams 622. The light beams 622 are irradiated on the underside of an optical disc 610 through an objective lens 623, thereby forming an optical spot 621. Thereafter, the light beams 622 are guided to a detector 626 for a servo, and a division detector 627 via a beam splitter 628, a hologram element 629, and so forth. Signals from the respective detectors are turned into servo signals such as a tracking error signal and a focus error signal after addition/subtraction processing to be thereby delivered to a servo circuit. On the basis of the tracking error signal, and focus error signal, as obtained, the servo circuit controls positions of an objective lens actuator 631 and the optical head 620 in whole, respectively, to thereby position the optical spot 621 in intended areas for recording and reproduction, respectively. An addition signal from the division detector 627 is delivered to a signal reproduction block 641. An input signal is processed for digitization after undergoing a filtering process and frequency equalization process executed by a signal processor circuit 645. Wobble information of grooves is detected as differential signals from the division detector 627, and is delivered to a wobble detector 642 inside the signal reproduction block 641. The wobble detector 642 has the function of generating a clock synchronized with a wobble signal, and discriminating between wobble waveforms. The wobble signal detected by the wobble detector 642 is converted into bit information by an address bit detector 643, and the bit information is subsequently detected as address information by a decoder 646. Based on the address information as detected, start timing signals for recording and reproduction processes, and so forth are generated to thereby control a demodulation circuit 644 for user data. At the same time, the address information is sent out to a control circuit (microprocessor) as well for use in accessing and so forth.

FIG. 11A shows the internal configuration of the wobble detector 642 by way of example. The differential signals (push-pull signals) from the division detector 627 are first delivered to a band-pass filter 421, and a signal only within a required band is extracted. A filtered signal is delivered to an A/D converter to be digitized. A digital signal is delivered to a PLL circuit 425. The PLL circuit 425 comprises a voltage controlled oscillator (VCO) 426, a carrier signal generator (divider/multiplier) 424, and a frequency-phase comparator 423. In the case of an example according to the third embodiment, the VCO 426 causes a signal to be oscillated at a wobble channel clock frequency 36 times as high as a wobble frequency to be subsequently divided by a factor of 36 by the divider 424, thereby generating a carrier signal. The carrier signal is compared with the digital signal in respect of phase and frequency. Based on results of such comparison, a rotational frequency of the optical disc is controlled, and concurrently, an oscillation frequency of the VCO 426 is controlled, so that the carrier signal synchronized with the wobble signal can be generated.

A reference signal generator 429 generates a sinusoidal signal as a reference signal, having a cycle identical to that of the wobble frequency. A product of the reference signal and the wobble signal as digitized is calculated, the result of which is integrated for a wobble channel bit portion by an integrator 427. An integration result provides a plus value or a minus value, corresponding to wobble data 0, or 1, respectively. Accordingly, a comparator 428 can determine whether the wobble signal is 0 or 1.

If respective phases of wobble waveforms of the grooves adjacent to the land, and on both sides thereof, are inverted from each other, there is a possibility of the amplitude of a reproduced wobble waveform in the land becoming nearly zero as described with reference to FIG. 7. In such a case, an integration output also becomes nearly zero. Accordingly, it is possible to determine whether the amplitude of a mark signal in the land is large or small by utilizing an integration output value. As previously described, as for the mark signal, it is desirable from the viewpoint of detection reliability to compare respective magnitudes of amplitudes of a pair of marks with each other, so that the comparator preferably incorporates a memory (register) and compares respective amplitudes of a pair of mark signals delivered in time-series manner with each other for discrimination upon making determination.

As will be described later, with the present embodiment, the respective amplitudes of a plurality of the marks are integrated before making comparison in contrast with a case of comparing the amplitudes pair by pair, thereby further enhancing reliability. Such a configuration will be described later.

Further, in actual circuit configuration, circuit scale will be reduced and be more efficient if there is adopted a configuration wherein the reference signal generator is integrated with a multiplier, and the multiplier can perform a product-sum operation of fixed values, that is, a digital FIR filter configuration is adopted.

Figure 10:
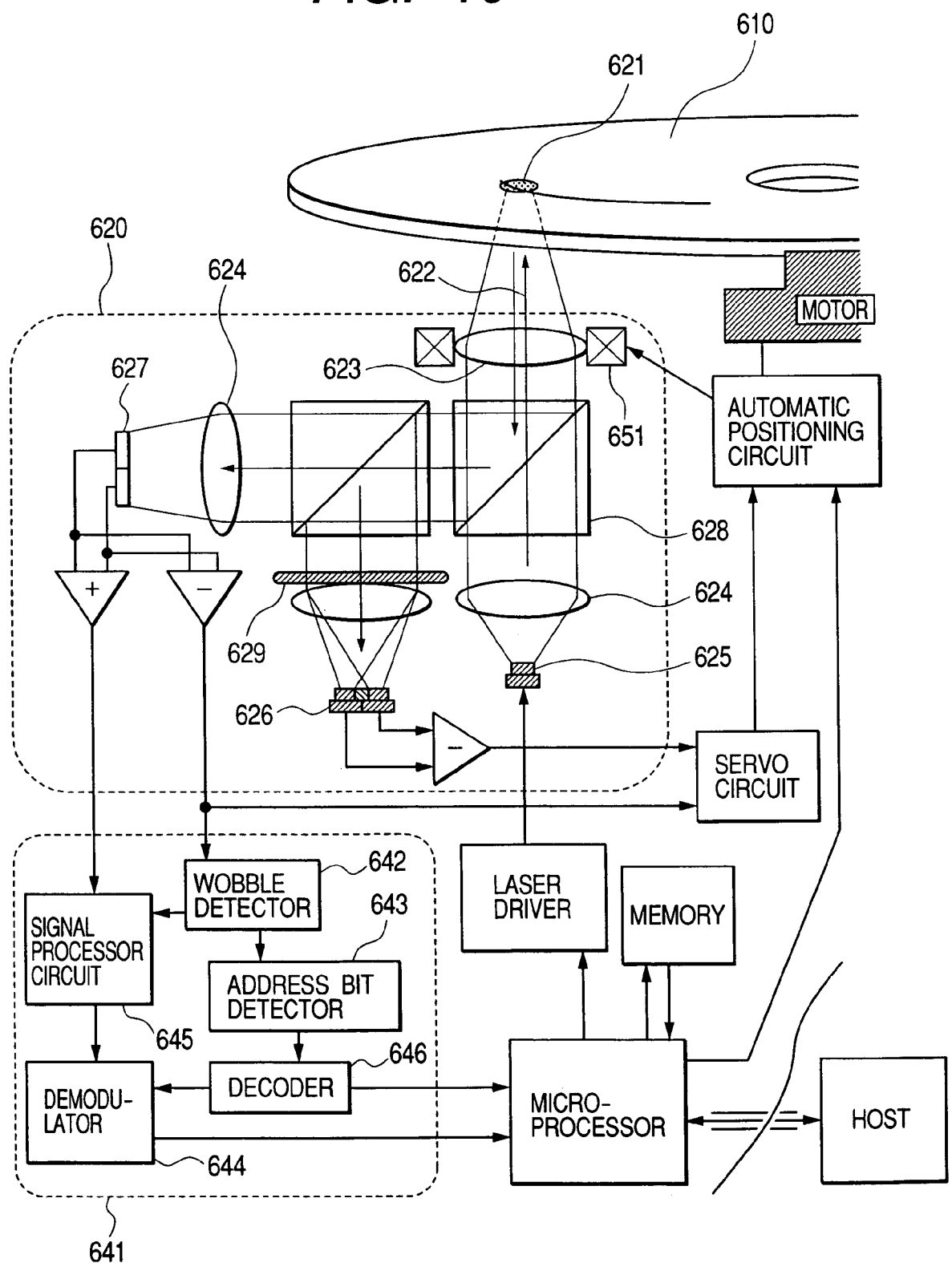
FIG. 10 is a block diagram showing an example of a recording and reproduction system using an optical disc, according to a third embodiment of the invention.
Figure 11A:
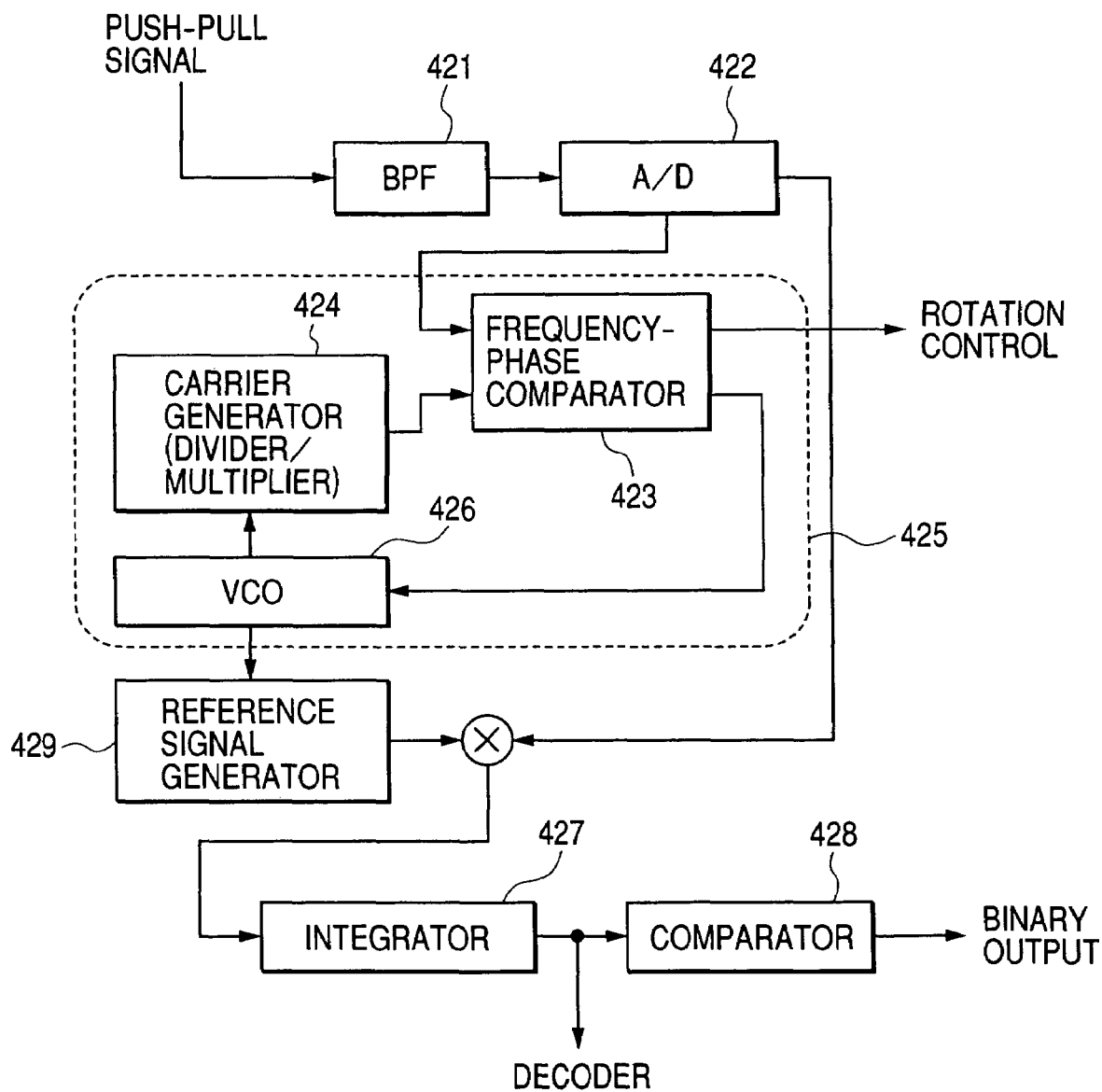
FIGS. 11A and 11B are block diagrams showing a wobble detector and an address bit detector, respectively, of the recording and reproduction system.
Figure 11B:
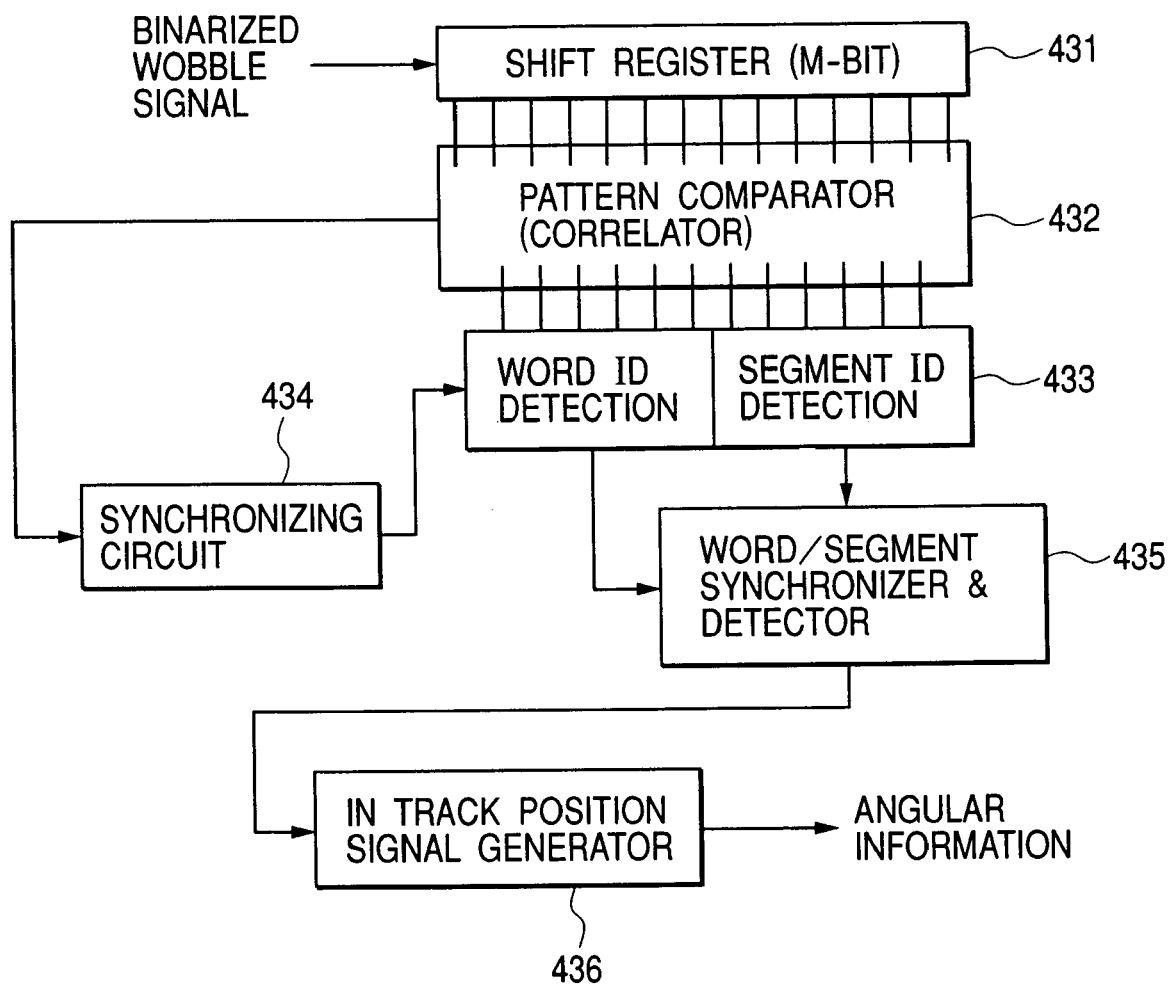

Wobble waveform data detected as above are processed by the address bit detector 643 in FIG. 10 to thereby determine respective classes of wobble rows, and concurrently, processing for synchronization with an address bit is executed, thereby detecting the address bit.

FIG. 11B shows a configuration of the address bit detector 643. Binarized output 0, 1, sent out from the wobble detector 642 is delivered to a shift register of 36 bits, and is compared in sequence with a pattern shown in the bottom part in FIG. 5 for every wobble cycle by a pattern comparator 432. Since a pattern "10001" appears only at the head of the respective units, when the binarized output has "10001" at the head thereof, the pattern comparator 432 determines that synchronization with a unit is detected, whereupon the pattern comparator 432 sends out a pseudo-synchronization signal to a synchronizing circuit 434. When the pseudo-synchronization signal is detected for every 36 bits, the synchronizing circuit 434 assumes that synchronization is attained, thereby creating a synchronization signal. Because the pseudo-synchronization signal sent out from the pattern comparator 432 itself is not necessarily a correct synchronization signal due to a noise and defect, occurring at the time of detection, the synchronizing circuit 434 checks periodicity to generate a protected unit synchronization signal that can be stably created in spite of the defect. Upon detection of an output from the pattern comparator 432 at timing of synchronization with a unit, values x, y, and z in FIG. 5 are obtained. These values are delivered to an address detection circuit 433 upon every synchronization with each of units. The address detection circuit 433 discriminates between SY1, SY2 at the respective heads of the segments on the basis of patterns of x, y, and z to thereby detect word numbers and segment numbers, representing angular synchronization information. A word/segment—synchronization/detection circuit 435 determines synchronization with words/segments by checking continuity of the word numbers and segment numbers. Upon completion of the synchronization with words/segments, angular position information is obtained by an in-track position signal generator 436. By use of the angular position information, remaining information of the respective segments, that is, track information is reproduced.

Figure 12:
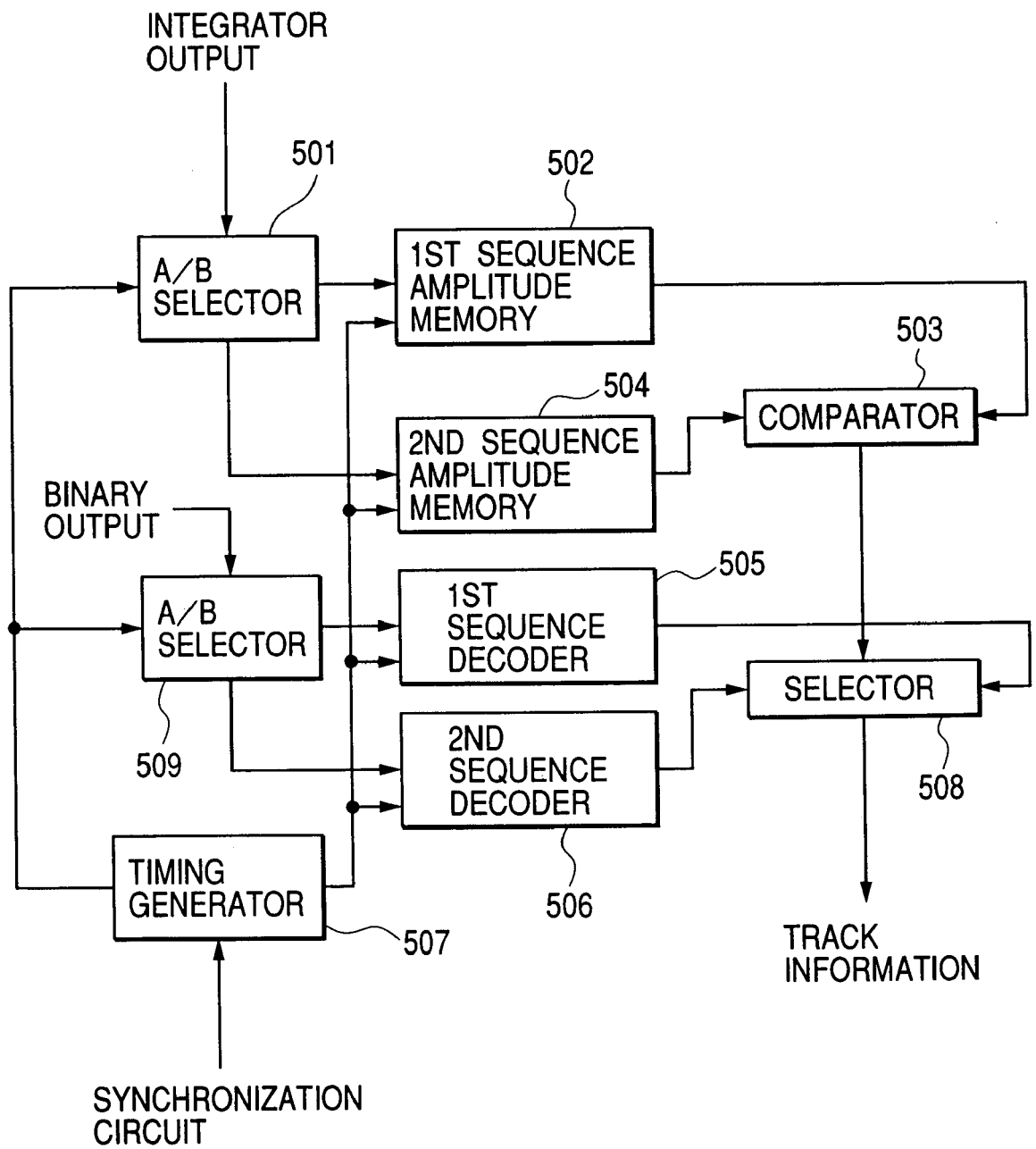
FIG. 12 is a block diagram showing an example of a decoder in FIG. 10.

An output from the integrator 427 in FIG. 11 is sent out to an A/B selector 501 in FIG. 12. The A/B selector 501 can change over between sequences A/B with a signal obtained from a timing generator 507 on the basis of the synchronization signal (angular information). Further, the binarized output in FIG. 11 is sent out to an A/B selector 509 in FIG. 12. The A/B selector 509 can change over between the sequences A/B with a signal obtained from the timing generator 507 on the basis of the synchronization signal (angular information). With both the A/B selectors, selection of the sequences A/B can be changed over depending on whether a relevant unit is an even numbered unit or odd numbered unit (odd units are referred to as the sequence A, and even units are referred to as the sequence B; reference FIG. 5). The A/B selector 501 sends out the sequence A to a first sequence amplitude memory 502, and the sequence B to a second sequence amplitude memory 504. Further, the A/B selector 509 sends out the sequence A to a first sequence decoder 505, and sends out the sequence B to a second sequence decoder 506. The amplitude memories for the respective sequences integrate the respective amplitudes of the marks. The decoders for the respective sequences send out the binarized output, respectively, to a decoding circuit according to an output of the timing generator 507 to thereby execute correction/detection of errors, and decoding processing as necessary. A comparator 503 compares integrated amplitudes of the marks of the first sequence with those of the second sequence, and selects an output of either the first sequence decoder or the second sequence decoder on the basis of the result of comparison to be sent out as track information. The circuit shown in FIG. 12 corresponds to the decoder 646 in FIG. 10.

With the circuit according to the invention, since determination on the marks can be made by integrating the respective amplitudes of the plurality of the marks instead of determining the marks on the basis of the amplitude of the individual marks, there is no need for worrying about an error in determination. As another example, a majority method of determination by integrating determination results (binary data) instead of integrating the respective amplitudes is also applicable. In either case, it is possible to evaluate and determine the marks with extremely high reliability. In the latter case of the majority method of determination, even on the assumption that reliability is extremely low to the extent that a ratio of erroneous determination of a pair of the marks is 10%, a ratio of erroneous detection of the address bit becomes less that $10^{-15}$ since there are 65 pieces (pairs) of the marks per one revolution, so that a sufficiently high reliability for practical purposes can be secured. In practice, the measured value of a ratio of erroneous determination of the wobbles is on the order of 2 to 3% at most, so that a ratio of erroneous determination after the majority method of determination is not more than $10^{-32}$, thereby ensuring an extremely high reliability.

The decoders for the respective sequences, shown in FIG. 12, preferably perform decoding every time data corresponding to one segment are received in sequence. With the present embodiment, address data are in the form of the Reed-Solomon code with 4 bits in one segment, as one symbol, and since the respective address data (=track numbers) of 5 words belonging to the same track are same, accompanying parities are also same. Accordingly, even if data for 13 pieces of segments belonging to individual words are not all available, an identical code word can be made up by combining those with segment data of a preceding word, thereby enabling address information to be decoded. For example, when starting to read data of the segment S3 of Word 2 upon accessing, synchronization is established by reproduction of the segment S4, and address data from the segment S5 can be delivered to the decoder. In the case of the method according to the present embodiment, at a point in time when S5 through S12 of Word 2 are first delivered to the decoder, followed by reproduction of S0 through S4 of Word 3, data of all the words become available, so that decoded address information can be obtained. In this case, with the present embodiment, it is assumed that the parity is not used for correction, but used for detection only. Accordingly, a probability of overlooking an error in detection of address becomes $10^{-6}$, which is sufficiently small; however, in the case of a higher reliability being required, respective decoding results of successive two segments may be compared with each other. In this case, a probability of overlooking the error becomes $10^{-12}$.

On the other hand, in the case of the conventional wobble address method, since the address code words are made up on a word-by-word basis, in the case of starting to read from the middle of a word, an address can be delivered to a decoder only after waiting until the head of a succeeding word is reached, so that wait time occurs at the time of reproduction of an address, rendering this method unsuitable for high-speed accessing. In contrast, with the method according to the present embodiment, wait time hardly occurs, and since reproduction of address data is enabled by reproduction of approximately one word, high-speed accessing can be implemented.

The reproduction method according to the present embodiment has another advantageous effect in that it is possible with this reproduction method to reproduce an address code word on a segment-by-segment basis even in the middle of recording and reproduction, and to check the present position of an optical spot, so that even in the event of occurrence of deviation from the track due to an impact and so forth from outside, the deviation can be quickly detected, thus rendering the method suited for us in disturbing environments such as mobile usage. If deviation from the track occurs particularly in the case of write-once type recording, there is a possibility of occurrence of overwrite, raising the risk of breakage of the tracks. Hence, the method according to the present embodiment, capable of quickly detecting the deviation from the track, has large merits.

Fourth Embodiment

A wobble address format according to a fourth embodiment of the invention is described with reference to FIG. 13.

With the present embodiment as well, respective information tracks include a groove 11 and land 12, spirally provided on a substrate in disc-like shape, respectively. User information is recorded as recording marks 13 having different reflectances in both the land 12 and groove 11. A track interval (an average distance between the respective centers of a groove track and land track, adjacent to each other) is 0.34 μm. The groove 11 is a grooved part provided on the substrate, and the grooved part is about 35 nm deep. With the present embodiment, since it is assumed that recording/reproduction are executed by an optical head with a numerical aperture of about 0.65 at wavelength of about 405 nm, the groove depth of about 35 nm is substantially equal to an optical distance corresponding to one seventh of wavelength. The grooved part is formed so as to undergo minute displacements (wobbles) in the radial direction at amplitude of about 25 nmpp.

The substrate provided with the wobbles is fabricated by molding a polycarbonate (PC) substrate 0.6 mm thick with an injection molding machine using a die (nickel stamper) produced (mastering) in advance after exposure with UV laser light, development, and transfer, and by transfer from the die. With the present embodiment, a write-once recording film is laminated to the PC substrate, and subsequently, a pair of discs is stuck together such that respective recording film faces come into close contact with each other, thereby manufacturing a double-sided disc 1.2 mm in total thickness.

Figure 13:
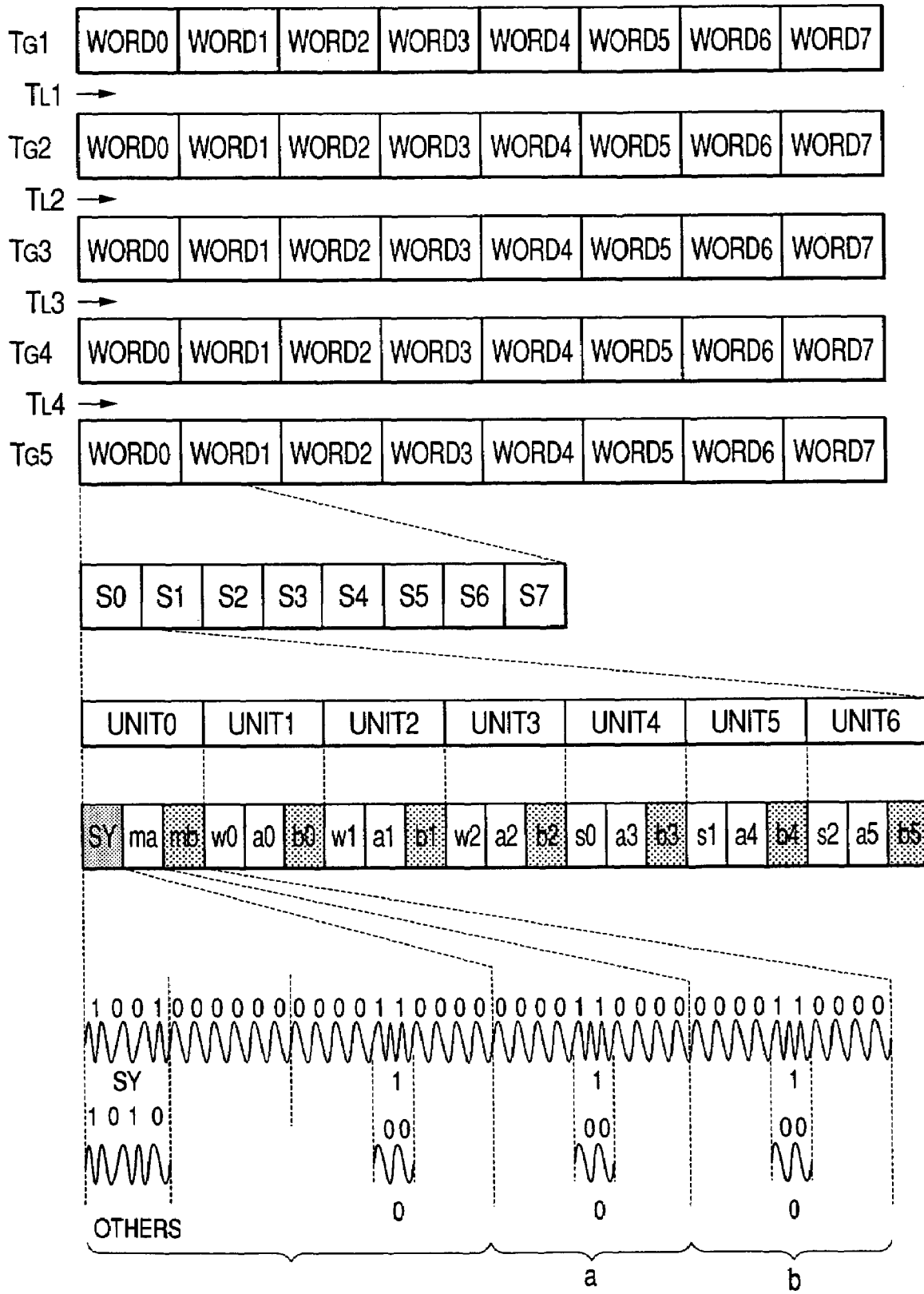
FIG. 13 is a schematic representation showing an example of a wobble address format according to a fourth embodiment of the invention.

FIG. 13 shows how wobble address information is disposed in respective tracks. In FIG. 13, information in groove tracks $T_G$ only is shown. The respective tracks comprise 8 words. The respective words comprise 8 segments, S0 through S7, and further, the respective segments comprise 7 units, U0 through U6.

The respective units comprise 40 cycles of wobbles, and the first half 20 wobbles represent angular information while the latter half 20 wobbles represent 2 bits (a pair) of track information. An angular information part comprises a portion "y" expressing a synchronization code (SY), and angular information part bits, providing 4 different patterns in all. With the present embodiment, the wobbles are modulated by the MSK (Minimum Shift Keying) method to express bit data. With the MSK method, wobble data "0" is expressed by one cycle of sinusoidal wave, and wobble data "1" is expressed by one and a half cycle of sinusoidal wave. Accordingly, a portion corresponding to "1" has a frequency 1.5 times higher.

Information (the angular information) included in the first half of the respective units are SY, w0, w1, w2, and s0 through s2. SY1 is a synchronization mark showing that a unit is at the head of the respective segments. Three bits of w0, w1, and w2 express a word number. Since one track has 8 words, the three bits express word numbers 0 through 7. s0 through s2 are segment numbers 0 through 7, respectively, expressing at what place a segment is in sequence of the segments within the respective words. Accordingly, only by reproducing the angular information corresponding to any one segment, it is possible to identify a position within a track, in the circumferential direction, however, since one track has 64 (=8×8) pieces of the segments, there is sufficient redundancy, so that reliability can be ensured by making a comprehensive determination after reproduction of information in a plurality of the segments.

The latter half of the respective units is differentiated between an area "a" expressing first address information and an area "b" expressing second address information. Signals "ma", and "mb", for showing which of respective pieces of the address information is valid, respectively, are recorded in the unit u0, at the head of the respective segments. Determination on which address is valid is made with respective reproduction signals of the "ma" and "mb". The balance of the units includes total 6 pairs of address data. That is, since the respective segments maintain 6 bits of the first address information and second address information, respectively, 48 bits each of the first and second address information are disposed in one word, that is, 8 segments.

Figure 14:
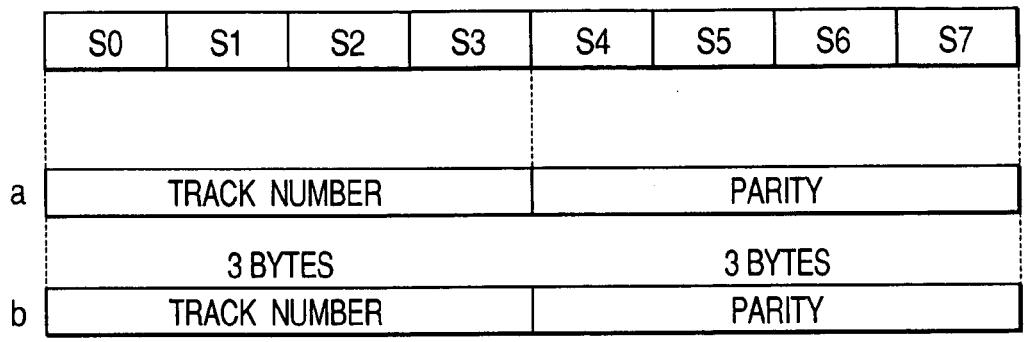
FIG. 14 is a schematic representation showing another example of the wobble address format according to the fourth embodiment of the invention.

FIG. 14 shows the breakdown of the 48 bits. That is, 3 bytes (24 bits) of track number, and 3 bytes (24 bits) of parity are recorded therein. The parity is made up as a Reed-Solomon code on Galois field GF ($2^4$), with 8 bits as one symbol. Accordingly, it is possible to correct errors up to 1 byte and to detect errors up to 3 bytes. In the figure, a and b correspond to the first address information and the second address information, respectively.

With the present embodiment, a manner in which mark signals and the address information are disposed in the respective segments is the same as that according to the second embodiment. In other words, those are disposed as shown in FIGS. 8 and 9.

With the present embodiment, since there is a pair of marks in the respective segments, there are 64 pairs thereof in each of the tracks. Further, since the 64 pairs are disposed so as to have the same information without fail, it becomes possible to determine a valid area with high reliability by detecting a plurality of the marks, and adopting a decision by the majority thereof. By taking advantage of the fact that the position of the valid area is reversed back-and-forth in adjacent tracks without exceptions, it is possible to enhance reliability of determination even in regions spreading across a plurality of the tracks.

With the present embodiment (FIG. 13), the number of the wobbles per one track is 8 (words)×8 (segments)×7 (units)×40 (wobbles)=17290, and is constant for all the tracks on the disc. That is, the wobbles themselves are recorded in constant angular velocity (CAV) mode. A cycle of the respective wobbles of a track at a position of the innermost radius 24 mm of the disc corresponds to a length of about 9 μm, and that of a track at a position of the outermost radius 58 mm of the disc corresponds to a length of about 22 μm.

With the present embodiment, a channel bit length of user data recorded in land tracks and groove tracks, respectively, is 0.09 μm. Because recording is made by use of RLL (1, 7) codes, the shortest mark length becomes 0.18 μm, and a user bit length about 1.35 μm. User capacity of the disc in whole is about 22 GB (per side). At the time of recording, a linear velocity of the disc is controlled so as to be constant. That is, CLV recording is carried out. With the present embodiment, the linear velocity is adjusted at 13.5 m/s such that a channel bit frequency is kept at 150 MHz. At the time of reproduction, a signal is reproduced in PRML mode. Since the disc is rotated at the CLV, the track at the innermost radius of the disc is quickly rotated at about 5800 rpm while the track at the outermost radius thereof is slowly rotated at a frequency of about 2400 Hz. Respective frequencies of the wobbles of the track at the innermost radius of the disc are about 1.7 MHz, and those at the outermost radius thereof are about 700 KHz. Since these frequencies are lower than the channel bit frequency by more than one order of magnitude, there is no risk of the wobble signals interfering with user recording signals. Further, in comparison with the servo's band of several KHz, those frequencies are higher by about two orders of magnitude, so that there is no need for worrying about an adverse effect on the servo.

Fifth Embodiment

A wobble address format according to a fifth embodiment of the invention is described hereinafter.

As with the case of the first embodiment shown in FIG. 2, respective information tracks according to the present embodiment include a groove 11 and land 12, spirally provided on a substrate in disc-like shape, respectively. User information is recorded as recording marks 13 having different reflectances in both the land 12 and groove 11. A track interval (an average distance between the respective centers of a groove track and land track, adjacent to each other) is 0.24 μm. The groove 11 is a grooved part provided on the substrate, and the grooved part is about 38 nm deep. With the present embodiment, recording/reproduction are executed with an optical head with a numerical aperture of about 0.85 at wavelength of about 405 nm. The grooved part is formed so as to undergo minute displacements (wobbles) in the radial direction at amplitude of about 15 nmpp.

As shown in FIG. 1A, information is recorded in respective wobbles such that one cycle of sinusoidal wave corresponds to information "1" and one cycle of sinusoidal wave with a phase thereof, inverted by 180 degrees, corresponds to information "0". That is, the information is recorded by a phase modulation (Phase Shift Keying; PSK) method. In this connection, the information recorded in the respective wobbles is mainly address information for specifying a recording area by guiding a light spot to an optional position on a disc and accessing thereto, which is preformed before shipment of the disc from a factory.

Because the address information has needs for identifying a track, different information is written to the respective tracks. For this reason, respective patterns of the wobbles are different track by track as shown in FIG. 1B, and by taking advantage of this, the respective tracks can be identified at the time of reproduction. In FIG. 1B, the wobbles are shown by shortening the respective cycles of the wobbles and accentuating the respective amplitudes of the wobbles, in the radial direction, for the sake of clarity in explanation (because it is practically impossible to show in the figure the respective amplitudes of the wobbles, corresponding to about 6% of the respective widths of the tracks).

Use is made of wobbles of a disc substrate fabricated by molding a polycarbonate (PC) substrate 1.1 mm thick with an injection molding machine using a die (nickel stamper) produced (mastering) in advance after exposure with UV laser light, development, and transfer, and by transfer from the die. In the case of the present embodiment, a phase-change write-once recording film is laminated to the PC substrate, and a transparent cover sheet 0.1 mm thick is bonded onto the phase-change write-once recording film with a UV curing resin, thereby fabricating a disc 0.7 mm thick. A pair of the discs each 0.7 mm thick are stuck together back to back with the PC substrate side thereof, facing away, thereby forming a disc 1.4 mm in total thickness.

Wobble address information is disposed in respective tracks in the same way as for the second embodiment (as shown in FIG. 5). That is, the respective tracks comprise 5 words. The respective words comprise 13 segments, S0 through S12, and further, the respective segments comprise 10 units, U0 through U9.

The respective units comprise 36 cycles of the wobbles, and the first half 18 wobbles represent angular information while the latter half 18 wobbles represent track information. The angular information in the first half include "y", a portion expressing whether it is a synchronization code (SY), and an identification signal "x", combinations of "x" with "y" resulting in 4 different patterns. The latter half 18 wobbles express 1 bit of the track information "z".

Information (angular information) included in the first half of the respective units are SY1, SY2, w0, w1, w2, and s0 through s4. SY1, SY2 are synchronization marks showing that these units are at the head of the respective segments. Two of the synchronization marks are disposed in each of the segments in order to enhance reliability (redundancy). Three bits of w0, w1, and w2 express a word number. Since one track has 5 words, the three bits express word numbers 0 through 4, respectively. Symbols s0 through s4 are segment numbers, respectively, expressing at what place a segment is in sequence of the segments within the respective words. Accordingly, by reproducing the information (the angular information) corresponding to any one segment, it is possible to identify a position within the respective tracks, in the circumferential direction thereof, however, since one track has 65 (=5×13) pieces of the segments, there is sufficient redundancy, so that reliability can be ensured by making a comprehensive determination after reproduction of the information in a plurality of the segments.

Information included in the latter half of the respective units are interleaved alternately for every other unit, and even number units maintain information corresponding to 4 bits (a0 through a3) of address information of sequence "a", respectively, while odd number units express 4 bits (b0 through b3) of address information of sequence "b", respectively. Mark signals "ma" and "mb", for indicating which address information is valid, are recorded in the units, U0 and U1, respectively, at the head of the respective segments.

Thus, since 4 bits each of the address information "a" and "b", corresponding to 4 bits, respectively, are maintained in the respective segments, 52 bits each of the address information "a" and "b", that is, 104 bits of the address information in total are disposed in one word, that is, 13 segments.

Figure 15:
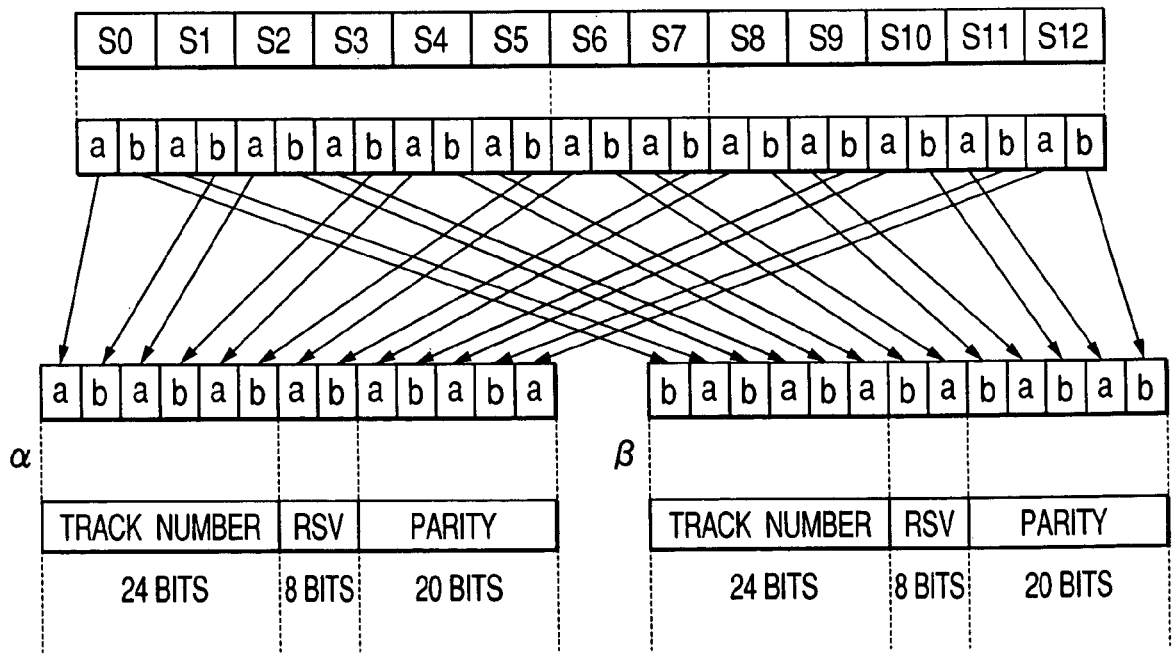
FIG. 15 is a schematic representation showing an example of a wobble address format according to a fifth embodiment of the invention.

As shown in FIG. 15, first address information α and second address information β are interleaved in the 104 bits of the address information. Such interleaving is implemented such that the first address information α and the second address information β are disposed at positions "a" and "b" in every segment, alternately, or are disposed so as to be inverted in the order reverse thereto. Track number of 24 bits, reserved bits of 8 bits, and parity of 20 bits are recorded in the first address information and second address information, respectively. The parity is made up as a Reed-Solomon code on Galois field GF ($2^4$), with 4 bits as one symbol. Accordingly, since 20 bits correspond to 5 symbols, it is possible to correct errors up to 2 symbols out of 52 bits (13 symbols), and to detect errors up to 5 symbols.

FIG. 16 shows a manner in which the mark signals are disposed in the respective segments. In the figure, $T_G(4n)$ denotes the 4n-th groove track. In the 4n-th groove track, 0, 1 are assigned to a pair of marks "ma", "mb", respectively, in the segment S0 thereof, and 0, 0 are assigned to a pair of marks "ma", "mb", respectively, in the segment S1 thereof. In the same track, mark information assigned to all even number segments (S0, S2, . . . ) differs from mark information assigned to all odd number segments (S1, S3, . . . ), but the mark information in all the even number segments is identical and the mark information in all the odd number segments is identical. In the (4n+1)-th groove track, 0, 0 are assigned to marks "ma", "mb", respectively, in the respective even number segments, and 1, 0 are assigned to marks "ma", "mb", respectively, in the respective odd number segments. In the (4n+2)-th groove track, 1, 0 are assigned to marks "ma", "mb", respectively, in the respective even number segments, and 1,1 are assigned to marks "ma", "mb", respectively, in the respective odd number segments. Further, in the (4n+3)-th groove track, 1, 1 are assigned to marks "ma", "mb", respectively, in the respective even number segments, and 0, 1 are assigned to marks "ma", "mb", respectively, in the respective odd number segments.

With such an arrangement, the mark signals within parts in the figure, indicated by an ellipse, respectively, become common with those in a land interposed between respective grooves adjacent to each other while the polarity of a wobble signal in other parts is reversed. Accordingly, as previously described with reference to the embodiment described hereinbefore, the mark signal in respective lands of the parts surrounded by the ellipse, respectively, in FIG. 16, becomes larger as compared with those in other parts. For example, in a land track $T_L(4n)$ interposed between $T_G(4n)$ and $T_G(4n+1)$, the amplitude of the mark "ma" in the even number segment (S0, S2, . . . ) becomes larger than that of the mark "mb", and it can be determined from this that the first address information area "a" is valid. Further, in the land track $T_L(4n)$ interposed between $T_G(4n)$ and $T_G(4n+1)$, the amplitude of the mark "ma" in the odd number segment (S1, S3, . . . ) becomes larger than that of the mark "mb", and it can be determined from this that the first address information area "a" is valid. In the grooves, if "ma" differs from "mb", it is determined that "a" is valid, and if "ma" equals "mb", it is determined that "b" is valid. For example, because "ma" differs from "mb" in the respective even number segments of the groove $T_G(4n)$, it can be determined that the first address information area "a" is valid.

With the present embodiment, since there is a pair of the marks in each of the segments, there are 65 pairs thereof in each of the tracks. Further, since the 65 pairs are disposed so that the valid areas are alternated without fail, it becomes possible to determine the valid area with high reliability by detecting a plurality of the marks and by virtue of continuity thereof. Further, because the number of the segments per track is odd, the position of the valid area in adjacent tracks is reversed back and forth without exceptions even in regions spreading across the tracks. Taking advantage of this, that is, taking advantage of the fact that the respective valid areas are reversed segment by segment without exceptions, it is possible to enhance reliability of determination on the valid areas with ease even without determining a boundary between the adjacent tracks in regions spreading across a plurality of the tracks. In other words, with the present embodiment, highly reliable detection of the valid areas is enabled with greater ease because it is unnecessary in determining the valid areas to have information on track boundaries.

FIG. 17 shows the address information disposed in the first and second address information areas, respectively. In the respective even number segments of the groove track $T_G(4n)$, a track number 4n is disposed in the first address information area "a", and a track number (4n−1) is disposed in the second address information area "b". Further, in the respective odd number segments of the groove track $T_G(4n)$, a track number (4n−1) is disposed in the first address information area "a", and a track number 4n is disposed in the second address information area "b". Accordingly, since the first address information area "a" is valid in the respective even number segments of the groove track $T_G(4n)$ as previously described, valid address information (track number) is 4n. Further, since the second address information area is valid in the respective odd number segments of the groove track $T_G(4n)$ as previously described, valid address information (track number) is similarly 4n. Inside the respective valid areas indicated by the ellipse in FIG. 16, respectively, in respective groove tracks as well, respective pieces of the address information disposed in the groove tracks on both sides of the respective land tracks, shown in FIG. 17, are identical to each other, so that it becomes possible as with the case of the second embodiment to reproduce an address from a wobble signal in the respective lands in the same way as in the grooves.

With the present embodiment, the number of wobbles per one track is 5 (words)×13 (segments)×10 (units)×36 (wobbles)=23400, and is constant for all the tracks on the disc. That is, the wobbles themselves are recorded in constant angular velocity (CAV) mode. A cycle of the respective wobbles of a track at a position of the innermost radius 22 mm of the disc takes place across 6.4 μm, and that of a track at a position of the outermost radius 58 mm of the disc across 15.5 μm.

With the present embodiment, a channel bit length of user data recorded in the land track and groove track, respectively, is 0.06 μm. Because recording is made by use of RLL (1, 9) codes, the shortest mark length becomes 0.12 μm, and a user bit length about 0.9 μm. User capacity of the disc in whole is about 100 GB (per side). At the time of recording, a linear velocity of the disc is controlled so as to be constant. That is, CLV recording is carried out. With the present embodiment, the linear velocity is adjusted at 12 m/s such that a channel bit frequency is kept at 200 MHz. At the time of reproduction, a signal is reproduced in PRML mode. Since the disc is rotated at the CLV, the track at the innermost radius of the disc is quickly rotated at about 5200 rpm while the track at the outermost radius thereof is slowly rotated at a frequency of about 1900 Hz. Respective frequencies of the wobbles of the track at the innermost radius of the disc are about 2 MHz, and those at the outermost radius thereof are about 700 KHz. Since those frequencies are lower than the channel bit frequency by more than two orders of magnitude, there is no risk of the wobble signals interfering with user recording signals. Further, in comparison with the servo's band of several KHz, those frequencies are higher by about two orders of magnitude, so that there is no need for worrying about an adverse effect on the servo.

Now, it is to be pointed out that the scope of the invention is not limited to the embodiments described hereinbefore. For a recording layer, use may be made of, for example, a magneto-optical recording medium, and dye-type write-once medium. Further, use may be made of a multilayer recording medium made up of not less than two recording layers each recording independent information. In this case as well, since use of headers is unnecessary in contrast with the conventional land/groove address method, interference between layers can be suppressed, which is convenient. The invention is certainly applicable to a multivalued recording method. Further, there is no doubt that the same advantageous effect can be obtained by use of QPSK, amplitude modulation, and frequency modulation. In either case, the marks for selection of the valid areas are preferably detected and determined by taking advantage of the fact that there occurs a difference in waveform of the wobble reproduced in the land between a case where the respective waveforms of the wobbles in respective grooves on both sides of the land are identical and a case where the respective waveforms of the wobbles described differ from each other.

As described, with the wobble address method according to the invention, synchronization with the address signal is easy, that is, the address signal can be reproduced at a high speed. Further, because of an efficient method of modulation of the address signal, and a redundancy ratio thereof, the address information can be detected with high reliability. Such an advantageous effect is pronounced particularly in the case of optical recording/reproduction using a blue light source when a signal light amount and reproduction quality tend to deteriorate. Further, because the wobbles are capable of maintaining additional data other than the address information so as to provide a recording optical disc with necessary medium information without use of embossed pits, a disc with high reliability (high security) can be implemented at low cost and with ease. Such capability of the wobbles maintaining the additional data has come to be implemented only after introduction of the wobbles of the invention, having a high detection efficiency.

The invention under the present application includes the following configurations as well:

1. An information recording medium having a plurality of tracks, wherein the respective tracks at least comprise a plurality of segments, having redundancy of identical information being maintained in at least two of the segments of the same track, and the redundancy is provided such that original information can be restored by extracting part by part from an optional portion of a plurality of segments with identical information disposed therein and synthesizing the parts.

2. An information recording medium having a plurality of tracks, wherein the respective tracks at least comprise a plurality of segments, identical information is maintained in at least two of the segments of the same track, and information for detection/correction of an identical error is at least added to the identical information and is disposed in the respective segments along with the address information.

With the optical disc of the invention, it becomes possible to use the wobble address method having an advantageous format efficiency in combination with land/groove recording capable of narrowing down tracks, so that a reproduction method using a large capacity optical disc capable of high-density recording can be implemented.

What is claimed is:

1. An information recording medium having a plurality of land tracks and groove tracks, comprising:
   at least one segment extending in the circumferential direction, disposed in each of the land tracks or the groove tracks;
   an address information area disposed in each said at least one segment;
   a first address information area and a second address information area in which address information indicative of addressing information of the tracks is recorded respectively, extending in the circumferential direction of the respective tracks and disposed in the address information area;
   a physical mark area disposed with respect to each said at least one segment, including a physical mark different from said address information, for generating a selection signal to determine which of the first address information area and a second address information area is valid with respect to a track corresoonding to the address information area.

2. An information recording medium according to claim 1, wherein the selection signal is disposed such that the first address information area and the second address information area become alternately valid from segment-to-segment.

3. An information recording medium according to claim 1, wherein the selection signal is disposed such that the first address information area and the second address information area become alternately valid from track-to-track.

4. An information recording medium according to claim 1, wherein the selection signal is disposed such that the first address information area and the second address information area become alternately valid from segment-to-segment and the number of the segments per track is odd.

5. An information recording medium according to claim 1, wherein the first address information area and the second address information area comprise track ID information, respectively, and the track ID information recorded in the first address information area differs from the track ID information recorded in the second address information area within the same segment.

6. An information recording medium according to claim 1, wherein the address information comprises track identification information and angular position identification information, and respective pieces of the angular position identification information in a plurality of the tracks are identical to each other.

7. An information recording medium according to claim 6, wherein the address information comprises the track identification information and the angular position identification information, and the angular position identification information is disposed such that an angular position is established by reproduction of the angular position identification information corresponding to at least a portion of one round of the track.

8. An information recording medium according to claim 1, wherein the address information is disposed so as to be interleaved throughout a plurality of the segments.

9. An information recording medium according to claim 1, wherein the track comprises two sequences of information tracks, alternately disposed, and in the information track of one sequence out of the two sequences, first address information is identical to the address information in either of adjacent information tracks of the same sequence while second address information is identical to the address information in the other of the adjacent information tracks of the same sequence.

10. An information recording medium according to claim 9, wherein the two sequences of information tracks are a groove track and a land track.

11. An information reproduction method using an information recording medium having first and second address information disposed in a segment in a track extending in a circumferential direction, said method comprising:
   reproducing a physical mark composed of a pair of marks disposed in a segment, where the physical mark is different from the first and second address information;
   reproducing and decoding the first and second address information;
   generating a selection signal based on the pair of marks;
   determining which of the first and second address information is valid based on the selection signal; and then
   selecting address information of the first and second address information determined as being valid; and
   reproducing the address information.

12. An information reproduction method according to claim 11, wherein the reliability is evaluated by integrating respective amplitudes of a plurality of marks.

13. An information reproduction method according to claim 11, comprising: reproducing a plurality of the selection signals, a given selection signal indicating which of the first address information and the second address information is valid.

14. An information recording medium having a plurality of tracks, the tracks each comprising:
   at least one segment extending in the circumferential direction of the respective tracks;
   an address information area disposed in each said at least one segment;
   a physical wobble structure, a first address information area and a second address information area disposed in each of the address information areas, each of which is extending in the circumferential direction of the respective tracks, where the physical wobble structure is different from the first address information area and the second address information area;
   wherein a reproduced signal of the physical wobble structure is utilized to determine which of the first address information area and the second address information area is valid.

15. An information recording medium according to claim 1,
wherein said physical mark is comprised of a pair of marks arranged such that a first paired mark is coincidence with a second paired mark formed in a next track, and pairs of marks coincidence changes alternatively in a cross track direction.

16. An information recording medium according to claim 14,
wherein said physical wobble structure is comprised of a pair of wobbles arranged such that a first paired wobble is coincidence with a second paired wobble formed in a next track, and pairs of wobbles of coincidence changes alternatively in a cross track direction.

17. An information recording medium according to claim 1,
wherein said physical mark is comprised of a pair of marks arranged such that a first paired mark has a shape which is coincidence in phase with a shape of a second paired mark formed in a next track, and wherein phases of shapes of pairs of marks of coincidence changes alternatively in a track-to-track direction.

18. An information recording medium according to claim 14,
wherein said physical wobble structure is comprised of a pair of wobbles arranged such that a first paired wobble has a shape which is coincidence with a shape of a second paired wobble formed in a next track, and wherein phases of shapes of pairs of wobbles of coincidence changes alternatively in a track-to-track direction.

* * * * *